(12) United States Patent
Blank

(10) Patent No.: US 8,210,850 B2
(45) Date of Patent: Jul. 3, 2012

(54) LITERACY EDUCATION SYSTEM FOR STUDENTS WITH AUTISTIC SPECTRUM DISORDERS (ASD)

(76) Inventor: Marion S. Blank, Tenafly, NJ (US)

( * ) Notice: Subject to any disclaimer, the term of this patent is extended or adjusted under 35 U.S.C. 154(b) by 1303 days.

(21) Appl. No.: 10/931,286

(22) Filed: Aug. 31, 2004

(65) Prior Publication Data

US 2005/0064375 A1    Mar. 24, 2005

Related U.S. Application Data

(63) Continuation-in-part of application No. 10/350,849, filed on Jan. 24, 2003, now abandoned.

(60) Provisional application No. 60/362,749, filed on Mar. 7, 2002.

(51) Int. Cl.
   *G09B 17/00* (2006.01)
(52) U.S. Cl. ......... 434/178; 434/167; 434/156; 434/157
(58) Field of Classification Search .................. 434/178, 434/159, 167, 156, 157
See application file for complete search history.

(56) References Cited

U.S. PATENT DOCUMENTS

| | | | |
|---|---|---|---|
| 2,193,048 A * | 3/1940 | Vander Velde | ............... 434/170 |
| 2,361,154 A | 10/1944 | Schoolfield | |
| 3,363,336 A | 1/1968 | Skinner | |
| 3,774,318 A | 11/1973 | Sterriti | |
| 4,437,837 A | 3/1984 | Schnettler et al. | |
| 4,713,008 A | 12/1987 | Stocker et al. | |
| 5,057,020 A | 10/1991 | Cytanovich | |
| 5,405,153 A | 4/1995 | Hauck | |
| 5,429,513 A | 7/1995 | Diaz-Plaza | |
| 5,451,163 A | 9/1995 | Black | |
| 5,649,826 A | 7/1997 | West et al. | |
| 5,735,693 A | 4/1998 | Groiss | |
| 5,788,503 A | 8/1998 | Shapiro et al. | |
| 5,893,717 A | 4/1999 | Kirsch et al. | |
| 5,920,838 A | 7/1999 | Mostow et al. | |
| 5,951,258 A | 9/1999 | Lueschow et al. | |
| 5,957,693 A | 9/1999 | Panec | |
| 6,009,397 A | 12/1999 | Siegel | |
| 6,022,222 A | 2/2000 | Guinan | |
| 6,215,901 B1 * | 4/2001 | Schwartz | ...................... 382/186 |
| 6,224,384 B1 | 5/2001 | Jenkins et al. | |
| 6,227,863 B1 | 5/2001 | Spector | |
| 6,254,395 B1 | 7/2001 | Breland et al. | |
| 6,261,101 B1 | 7/2001 | Benitz et al. | |
| 6,299,452 B1 | 10/2001 | Wasowicz et al. | |
| 6,302,695 B1 | 10/2001 | Rtischev et al. | |
| 6,305,942 B1 | 10/2001 | Block et al. | |
| 6,334,776 B1 | 1/2002 | Jenkins et al. | |

(Continued)

OTHER PUBLICATIONS

Shea, Gail. "Contemporary's The Write Stuff Shaping Sentence" Contemporary Books. Richmond Hill, Canada. 1985.*

(Continued)

*Primary Examiner* — Robert J Utama
(74) *Attorney, Agent, or Firm* — Oblon, Spivak, McClelland, Maier & Neustadt, L.L.P.

(57) ABSTRACT

A literacy system provides teaching for reading and writing skills particularly adapted to students with autistic spectrum disorders (ASD). In one embodiment, the literacy system may include exercises for teaching visual sequencing, motor skills, phonology, semantics, syntax, and text. The literacy system may have a pre-reading section, which includes exercises for developing visual sequencing skills and motor skills prior to teaching the skills of reading and writing words.

26 Claims, 19 Drawing Sheets

U.S. PATENT DOCUMENTS

| | | |
|---|---|---|
| 6,358,059 B1 | 3/2002 | Li |
| 6,468,084 B1 | 10/2002 | MacMillan |
| 6,491,524 B2 | 12/2002 | Bender |
| 6,511,324 B1 | 1/2003 | Wasowicz |
| 6,579,100 B1 | 6/2003 | Clark et al. |
| 6,601,850 B1 | 8/2003 | Ross |
| 6,632,174 B1* | 10/2003 | Breznitz ............ 600/300 |
| 6,676,413 B1 | 1/2004 | Best et al. |
| 6,729,882 B2 | 5/2004 | Noble |
| 6,736,641 B2 | 5/2004 | Quiroz |
| 6,755,657 B1* | 6/2004 | Wasowicz ............ 434/167 |
| 6,796,798 B1 | 9/2004 | Sanocki |
| 6,954,199 B2 | 10/2005 | Soto et al. |
| 7,249,950 B2* | 7/2007 | Freeman et al. ......... 434/155 |
| 2002/0076675 A1 | 6/2002 | Budra et al. |
| 2002/0106617 A1* | 8/2002 | Hersh ............ 434/236 |
| 2002/0164563 A1* | 11/2002 | Wasowicz et al. ......... 434/178 |

OTHER PUBLICATIONS

Davidson, Roseanna C. "The Auditory and Visual Sequencing of Good and Poor Spellers." Master Thesis, Dec. 1971.*

Blank et al., 1993, "Write Moves—A specialized pre-writing to handwriting program."

Blank, 1994, "Seeing Sequences Part II."

Blank, 1996, "The Sentence Master—A Program for Success in Reading Level 3."

* cited by examiner

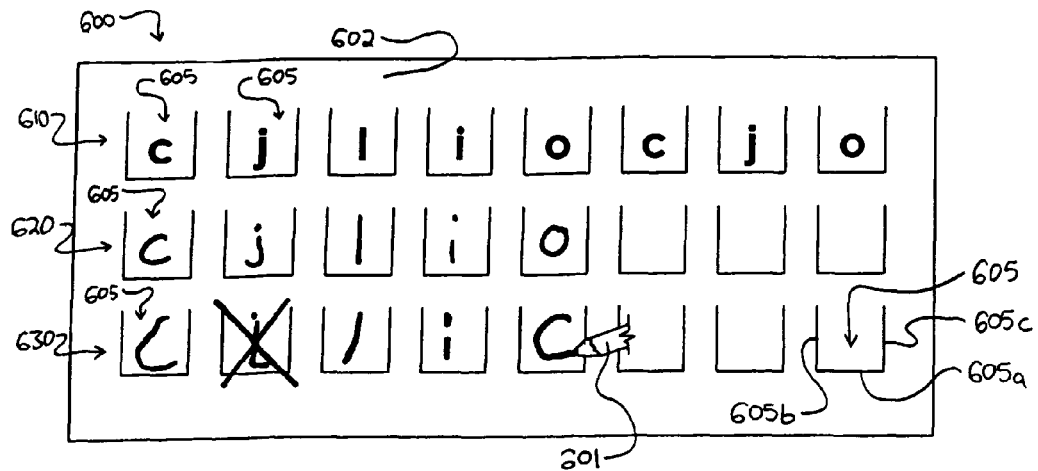
FIG. 16
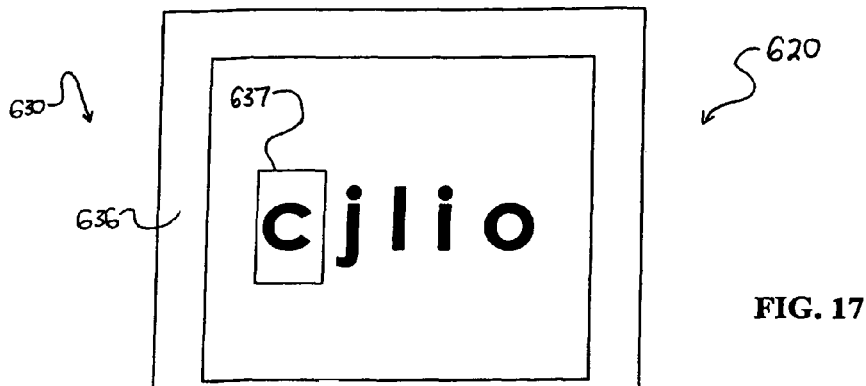
FIG. 17
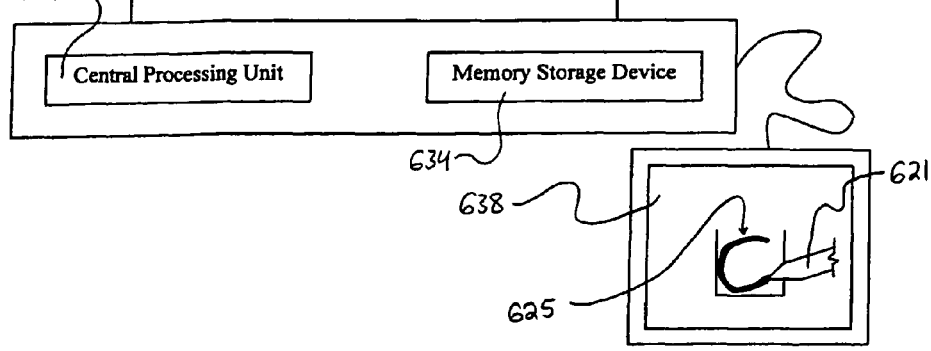

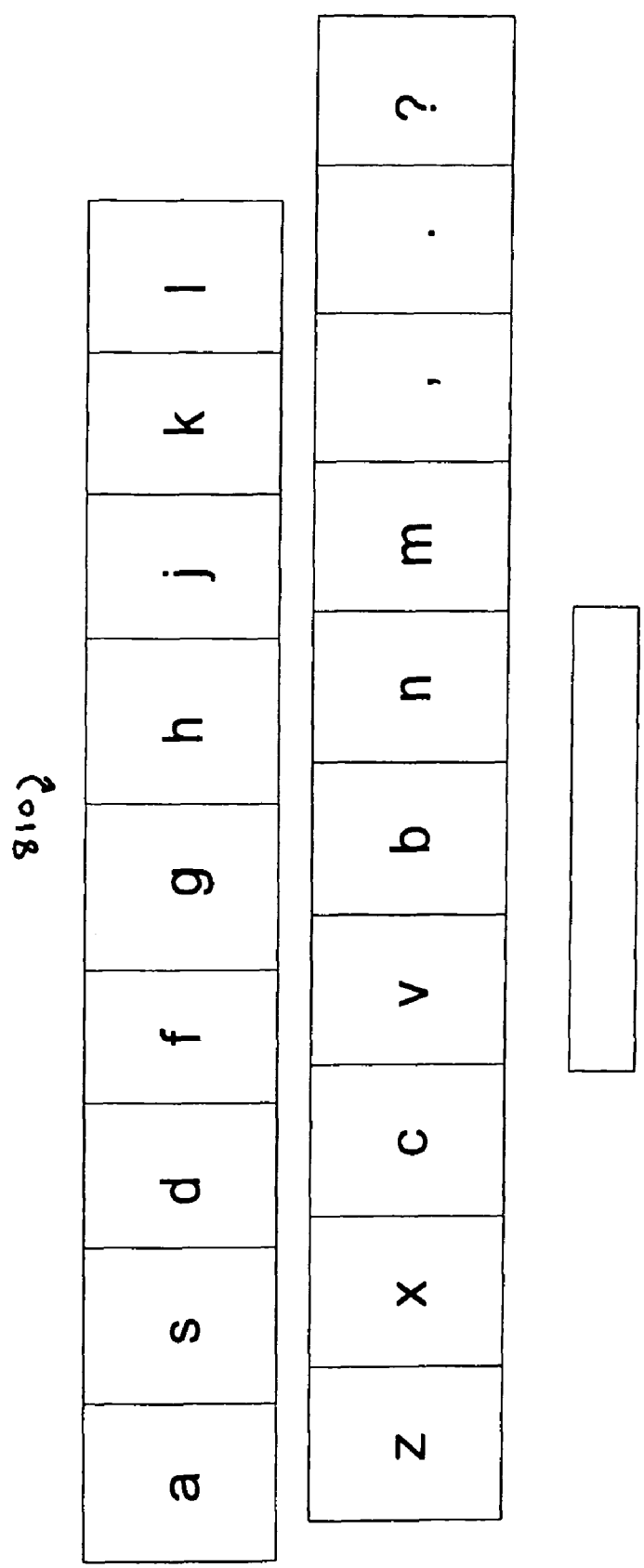

LITERACY EDUCATION SYSTEM FOR STUDENTS WITH AUTISTIC SPECTRUM DISORDERS (ASD)

REFERENCE TO RELATED APPLICATIONS

This application is a continuation-in-part of U.S. patent application Ser. No. 10/350,849 entitled "Literacy System," filed on Jan. 24, 2003 now abandoned, which claims benefit to U.S. Provisional Application Ser. No. 60/362,749 entitled "Literacy System," filed on Mar. 7, 2002, the entirety of which are incorporated herein by reference.

TECHNICAL FIELD

This invention relates to a system of literacy education, and more particularly to methods and systems for teaching reading and writing skills to students with autistic spectrum disorders (ASD).

BACKGROUND

Enormous effort goes into teaching language to students with ASD. That effort, though, is focused almost exclusively on spoken language. Minimal work is directed towards teaching the other form of language that is central to human communication: namely, written language. As a result, literacy in the ASD population is seriously constrained, often to the point of non-existence.

Autism is a type of disorder that interferes with a person's ability to communicate with and relate to others. Autism affects how a person perceives and processes sensory information. Signs of autism may develop before a child is three years old, although the condition is frequently not diagnosed until later. A common symptom of autism is difficulty with verbal and nonverbal communication. Without suitable training, language development in most children with autism may be delayed.

The severity of autism varies. Some individuals need assistance in almost all aspects of their daily lives, while other individuals that receive suitable training at an early age are able to function at a very high level and might attend school in a regular classroom.

The overall picture can be characterized as follows. A small percentage of students, mainly those at the highest cognitive levels, do achieve reading proficiency. Aside from this group, it is rare to find ASD children displaying any reasonable mastery of reading. Most students cluster into one of three groups.

Some fall into the group known as hyperlexics. This term refers to individuals who independently (i.e., without being taught) learn to decode, or read words. However, they show little or no comprehension of what they have decoded. Essentially these individuals are word callers who look at a text and say the words, much as if they were reading a telephone book.

Many ASD students who do not show independent mastery of reading are given instruction, generally in the form of bits and pieces of a traditional reading curriculum. For example, an entire year may be spent on teaching children to recognize the ten or twelve names of their classmates in written form. This approach, which provides a fractured and often meaningless set of skills, is not necessarily thought to be productive. Rather it is seen as the only option given the children's level of functioning.

The many ASD students who are either non-verbal or minimally verbal are essentially ignored. These students are deemed to be so limited that no discernible effort is made to teach any significant aspect of written language.

Despite what is commonly thought, this situation is not intrinsic to the students' limitations. Rather it stems in large measure from the two major systems that dominate the teaching of reading. These are phonics (which concentrates on sound analysis) and whole language (which concentrates on independent writing and complex stories). Neither system is appropriate or productive for most ASD students and so attempts to educate them via either of these systems are basically unsuccessful.

For ASD students to become literate, it is vital to move beyond the techniques offered by either phonics or whole language and instead provide students with ASD with a system that will permit them to acquire and demonstrate literacy.

SUMMARY

In one embodiment, a system for teaching skills associated with literacy can include a pre-reading section having visual sequencing exercises. The visual sequencing exercises can include foreign symbols as well as colors, shadings, and shapes.

In a further embodiment, a literacy system includes a first section that includes sequencing exercises. The sequencing exercises include colors that are not associated with letters of a written language taught by the literacy system. The literacy system also includes a language skills second section. The language skills section includes language exercises for teaching the following language activities: commands, declarative sentences, or questions. These activities embody all aspects of language including phonology, semantics, syntax and text.

In another embodiment, a system for teaching skills associated with literacy can include a pre-reading section having motor skills exercises. The motor skills exercises can teach handwriting of letters in order of motor skill simplicity. For example, the motor skills exercises may begin teaching handwriting with single-shaped letters. In one aspect, the motor skills exercises include constraining areas. Each constraining area is adapted to receive one handwritten letter.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 16 is an image of a motor skills exercise in accordance with one embodiment of the invention.

FIG. 17 is diagram of a motor skills exercise implemented on a computer system in accordance with another embodiment of the invention.

FIGS. 20A, 20B and 20C are display sheets with one or more rows of keyboard letters.

Like reference symbols in the various drawings indicate like elements.

DETAILED DESCRIPTION

Figure 1:
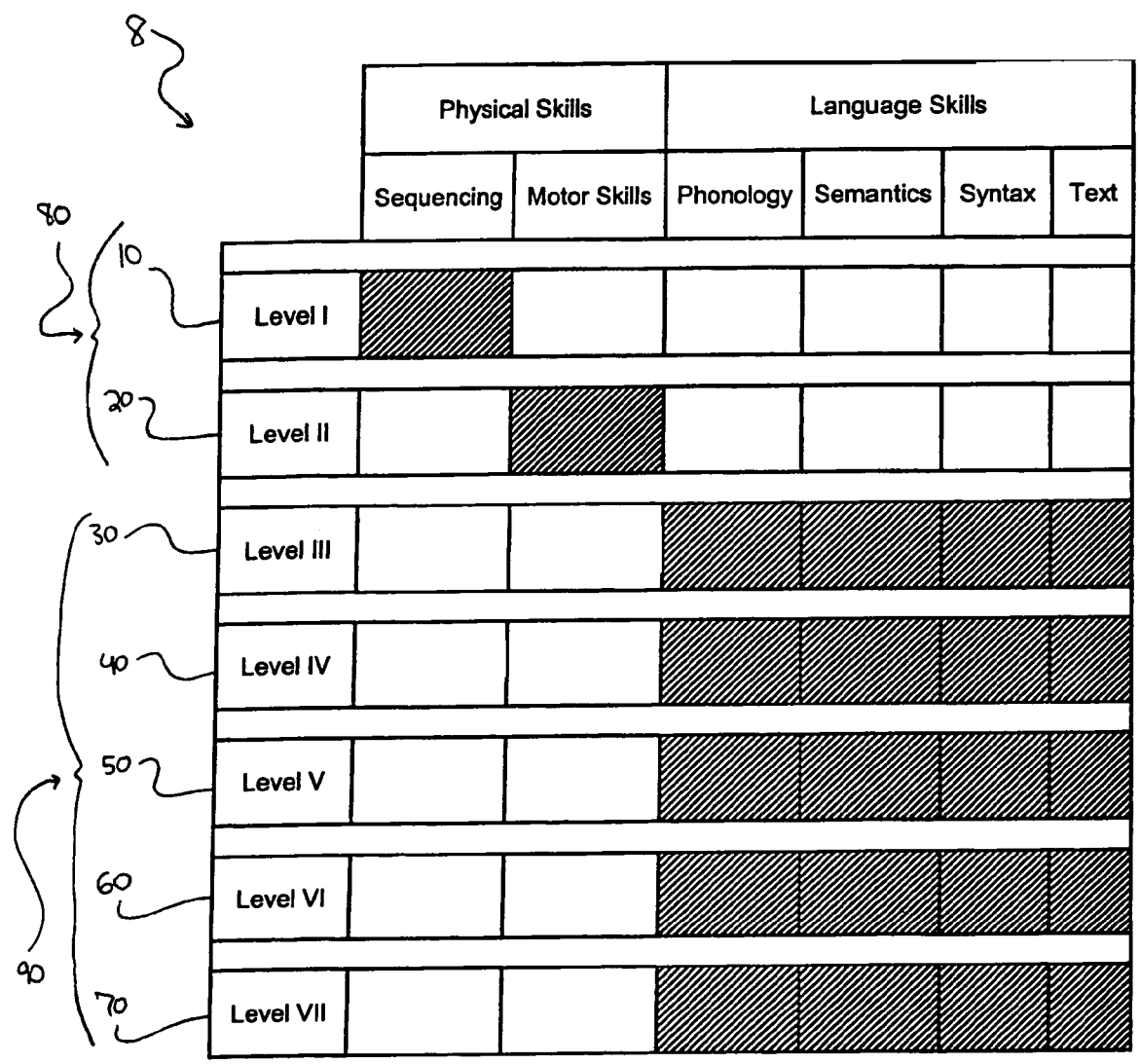
FIG. 1 is a chart depicting aspects of one embodiment of a literacy system in accordance with the invention.

Language activities, namely commands, declarative sentences and questions, represent the options that an instructor has in getting a student to respond to language. In the most frequent instances, an "instructor" is an adult and the "student" learning is a child. Hereinafter, the terms "teaching person," "instructor," "teacher" and "adult" are used interchangeably. Additionally, the terms "individual," "student" and "child" are used interchangeably. It will be understood that the term "adult" may include instructors of all ages and the term "child" may include individuals of all ages being taught.

Commands represent actions that the child performs on one or more objects. For example, for the following objects—a bus, a bird, a girl and a plane—the adult might say, at a simple level, "give me the girl" or at a more complex level involving double commands, "shake the bus and turn over the bird."

Declarative sentences represent meaningful statements that the adult provides which the child then has to write. For example, the adult might show a bus and say a statement such as "Here is a bus." By contrast, in teaching plurals, the adult might show two or more buses and say "Here are some buses." The child's response in this type of situation is to write the statement that has been provided. The accurate writing of the statements is a sign that the child is processing key aspects of the language message.

Questions represent queries that the adult poses for the child to respond to. The questions are carefully selected to be ones which contain words that can be carried over into the answer. For example, if (about a frog jumping) the child is asked, "What is this frog doing?" the answer is going to be "This frog is jumping." In typical communication, the words underlined are stated explicitly in the question but are contained only implicitly in the answer. For children with ASD, these intuitive linkages are absent so that the children see no connection between what one person says and what another replies. By making the implicit "carry over" words explicit, the children are provided with a tool for helping them crack the puzzle of verbal communication.

For all three activities just outlined, the adult can communicate the language via speaking (e.g., saying a command or question), writing (e.g., writing a command or question), or both (e.g., saying and writing a command or question). The child responds in one of two ways: to commands, the response is always via action; to statements and questions, the response is always via written language.

A key difference between a reading program for normal children versus that for autistic children is that a normal child can be assumed to understand a broad swath of spoken language and therefore the meaning of many words does not have to be taught to the normal child. By contrast, with autistic children, the meaning of most words must be taught. A key part of a literacy system to teach an autistic child is not to simply teach them to read but to have them to begin to understand the words of the language. Furthermore, comprehension is taught so that the autistic child learns the words that they see and the words that they hear are equivalent.

In general, in order to teach either a normal or an autistic child both reading and writing, six skills must be taught. Certain embodiments of the invention teach one or all of the following skills associated with total competence in literacy:

(1) sequencing—the ability to read, and retain, letters in the appropriate order, (2) motor skills—the hand-eye coordination required for writing, (3) phonology—the ability to recognize and produce the sounds of letters, (4) semantics—comprehension of the meaning of words, (5) syntax—the ability to recognize and use grammar, and (6) text—combining words to form meaningful messages.

Sequencing and motor skills are both types of physical skills associated with reading and writing, as described later in more detail. Briefly, visual sequencing exercises may be used to teach left-to-right scanning and memorization of symbols, letters, and words. Motor skills exercises may be used to develop handwriting abilities in a student such that subsequent reading and writing skills may be taught in tandem.

Phonology is a language skill relating to the processing of sounds, such as the sounds of individual letter combinations in a word. For example, if they are to recognize the words they are seeing and accurately produce the words needed for writing, children must learn that "eat" and "tea" or "spot" and "tops" represent totally different sounds even though the words in each pair contain identical letters. The skill of recognizing the proper sounds of letter combinations falls under the category of phonology.

Semantics is another language skill and is associated with the meaning of words. Typically, children with ASD are drawn to nouns and easily recognize words such as "cookie," "car," "chair," "ice cream," etc. However, they often have considerable difficulty with other classes of words such as verbs and adjectives. Even children who have a vocabulary of several hundred nouns will not know the meaning of simple verbs such as "put," "bring," or "make," or adjectives such as "flat," "soft," or "rough." The language skill of semantics enables a student to recognize the different meanings.

The language skill relating to the grammar of sentences is referred to as syntax. Critical to syntax is the use of non-content words. These are all the "little words" of the language that are fall outside the range of nouns, verbs, adjectives and adverbs—words like "is," "the," "but," "not," "there," etc.

While children with ASD have problems with semantics, their difficulties in syntax are even greater. As a result, without special instruction, they see no difference in sentences such as "the girl was walking the dog" and "the girl was walking to the dog." They cannot even see the difference in meaning created by the use of such basic non-content words as "was" versus "is."

Lastly, the language skill of text is associated with the ability to use combinations of words and sentences to form meaningful messages. In the early stages of learning to read, a student may be able to read only several words, and those words may not be combined so as to form a statement or sentence. As the student learns to read additional words, that student must also develop textual skills of combining those words in the appropriate order in order to express and comprehend a meaningful message.

In one embodiment of the invention, as shown in FIG. 1, a literacy system 8 comprises two sections 80 and 90, which focus on teaching physical skills and language skills, respectively. The literacy system 8 is divided into distinct levels. By way of example, the literacy system shown in FIG. 1 comprises seven levels 10, 20, 30, 40, 50, 60, and 70, but the literacy system 8 may include any number of levels. Each level teaches particular skill sets that may be used as building blocks for the following level in the literacy system 8. For example, the sequencing and motor skills taught in level I 10 and level II 20, respectively, may be used as foundations for the language skills taught in subsequent levels 30, 40, 50, 60, and 70.

In general, sequencing and motor skills are physical skills that may be taught to a student before the student actually begins to read words. Level I 10 teaches sequencing skills that are fundamental to the subsequent skills of reading and writing. Sequencing skills developed in level I 10 include the concept of scanning in a left to right pattern and retaining in memory sequences of letters or symbols. Level II 20 teaches the motor skills of writing letters of the alphabet in a manner that removes the mental "roadblocks" developed by traditional handwriting systems. The section 80 of the literacy system that includes level I 10 and level II 20 is referred to as the pre-reading section 80 because the skills taught in level I 10 and level II 20 may be developed before the student learns to read.

Section 90 of the literacy system 8 includes level III 30, level IV 40, level V 50, level VI 60, and level VII 70. Each of these levels 30, 40, 50, 60, and 70 develops the language activities using the skills of phonology, semantics, syntax, and text in the context to teaching the student to read and write. Thus, section 90 is referred to as the early reading section 90, or the language skills section 90, and may include both reading and writing exercises. The difficulty of the reading and writing exercises in each level 30, 40, 50, 60, and 70 increases as the student progresses to the subsequent level. Although the reading and writing exercises of each level may be the same, the words used by the literacy system increase in difficulty due to the length, meaning, and grammatical category. The reading and writing exercises of each level may be used to teach the student particular rules or words and develop hidden (intuitive) abilities generally possessed by literate people.

Figure 2:
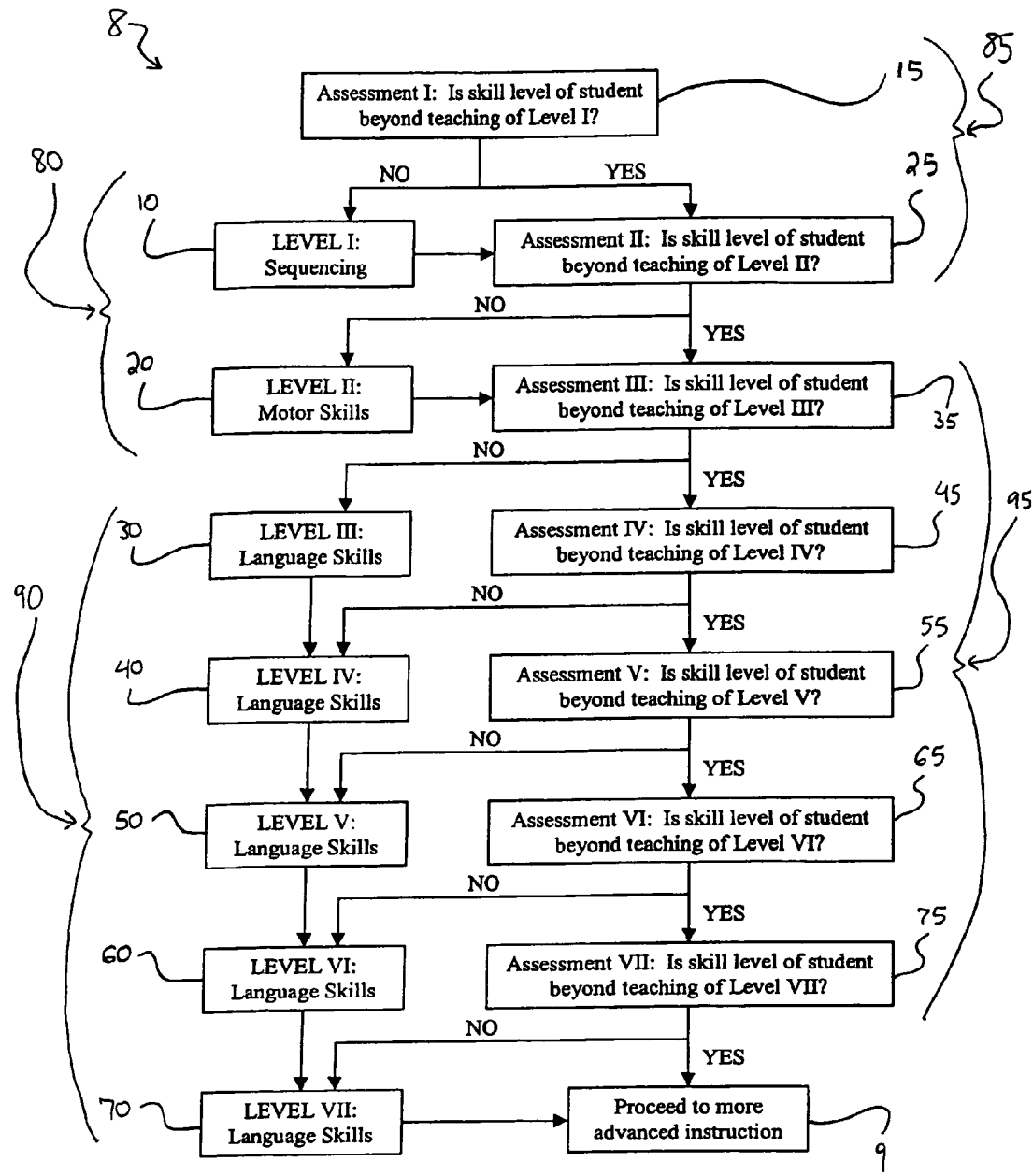
FIG. 2 is a flow diagram of the literacy system of FIG. 1.

Referring to FIG. 2, one embodiment of the literacy system 8 includes a series of assessment tests 15, 25, 35, 45, 55, 65, and 75 to enable the student to bypass particular levels of teaching where the student has already learned that material. The literacy system 8 may be individually tailored to the needs of particular students using the assessments 15, 25, 35, 45, 55, 65, and 75. For example, if a student possesses satisfactory sequencing and motor skills but not necessarily language skills, then the assessment-I 15, assessment-II 25, and assessment-III 35 may be completed to show that the student should bypass the pre-reading section 80 and begin learning from the literacy system 8 at level III 30.

As shown in FIG. 2, the student first completes assessment-I 15 to determine if the student's abilities surpass the sequencing skills taught in level I 10. The assessment-I 15 may include several example and practice exercises similar to those that are used in the actual teaching of level I 10 (described in further detail below). If the student performs satisfactorily during the assessment-I 15, the literacy system 8 may recommend that the student should bypass the teaching of level I 10 and proceed to assessment-II 25. However, if the student's performance during assessment-I 15 is not satisfactory, then the literacy system 8 may recommend that the student should begin receiving instruction from level I 10.

After the student satisfactorily completes assessment-I 15, or after the student satisfactorily completes level I 10, the student then proceeds to assessment-II 25 to determine if she already possesses satisfactory motor skills as taught in level II 20. Again, if the student's motor skills are beyond the teaching of level II 20, then the student should proceed to assessment-III 35. Otherwise, the student should complete level II 20 before continuing on to assessment-III 35. Alternatively, the student may perform both assessment-I 15 and assessment-II 25 at the same time before proceeding to level I 10, level II 20, or both. Because a student may have a solid grasp of some pre-reading skills and not others, the assessment-I 15 and assessment-II 25 are not necessarily dependent on one anther. For this reason, the assessment-I 15 and assessment-II 25 may be grouped as pre-reading assessments 85. For example, a student may need further instruction on sequencing skills, but that same student may have a satisfactory understanding of the alphabet and handwriting skills. As such, the student may complete assessment-I 15 and assessment-II 25 prior to working on any levels 10 or 20 so as to determine which levels 10 or 20, if any, should the student bypass before proceeding to assessment-III 35.

If the student satisfactorily completes assessment-III 35 to show that she possesses language skills beyond the teaching of level III 30, then that student should proceed to assessment-IV. This pattern continues until the student does not satisfactorily complete an assessment 35, 45, 55, 65, or 75, in which case that student proceeds to receive instruction from the appropriate level 30, 40, 50, 60, or 70. If the student satisfactorily completes all of the early reading assessments 95, then that student should proceed to more advanced instruction 9 beyond the early reading sections 90.

Because level III 30 through level VII 70 teach the same type of skills while increasing in difficulty, the early reading assessments 95 may be developed to be dependent on one another. For example, if a student satisfactorily completes assessment-III 35 but fails to perform as well on the subsequent assessment-IV 45, then that student should begin to receive instruction from level IV 40. After that student successfully completes level IV 40 instruction, then the student proceeds directly to level V 50 without the need to complete assessment-V 55, which results is a more productive use of time. Because level V 50 provides instruction on language skills similar to level IV, but having a greater degree of difficulty, the early reading assessments 95 may be developed so that there is no need to return to the assessments 95 after the student has not satisfactorily completed a particular assessment. One reason for this is that a student who does not possess language skills for a particular set of words is unlikely to possess those same language skills (phonology, semantics, syntax, and text) for words having a greater degree of difficulty. Alternatively, the early reading assessments 95 may be implemented such that the student does return to an assessment corresponding to the subsequent level after completing the prior level.

Once the early reading assessments 95 lead the student to the appropriate starting level 30, 40, 50, 60, or 70 for that individual, the student proceeds through the levels in order. For example, if the early reading assessments 95 lead the student to begin instruction at level III 30, then the student should proceed to level IV 40 after successfully completing level III 30. This pattern continues through completion of level VII where the student may then proceed to more advanced instruction 9 beyond the early reading levels 90.

Figure 3:
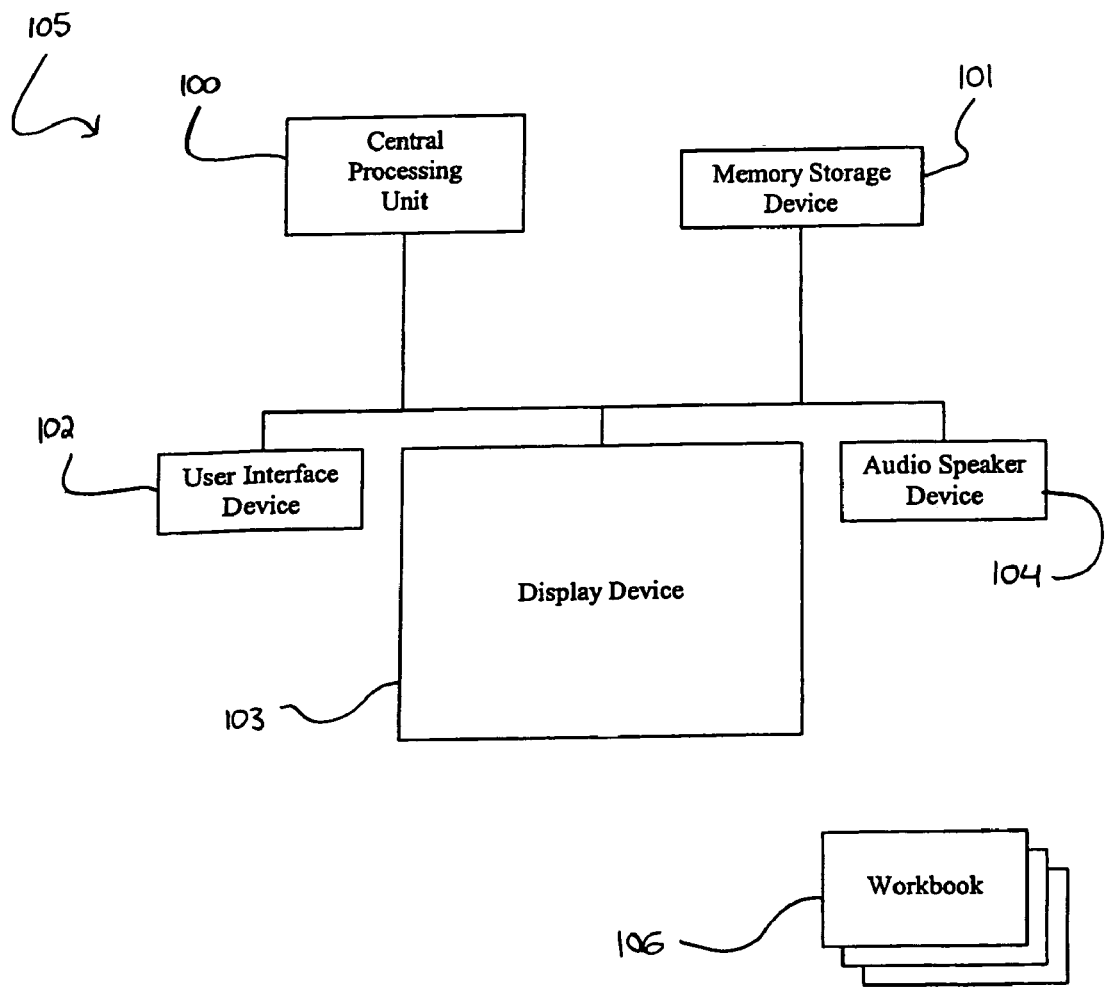
FIG. 3 is a diagram of a computer system that may be used to operate the literacy system in accordance with one embodiment of the invention.

The teaching of the literacy system 8 may be delivered to the student in the format of paper workbooks, video or classroom presentations, computer software, or a combination thereof. For example, the individual reading and writing exercises may be presented in a conventional workbook format such that the exercises occupy individual worksheets in the workbook. As shown in FIG. 3, the literacy system 8 may alternatively be used as a computer software such that the student interacts with the computer system 105 to complete some or all of the exercises. In one embodiment, the literacy system 8 may be executable as a software program stored on a computer readable medium in a computer memory storage device 101, such as a computer hard drive, a floppy disk drive, a CD-ROM drive, or other conventional devices. The user may utilize a user interface device 102, such as a keyboard, computer mouse, touchscreen, or a combination thereof, to execute the literacy system 8 from the computer memory storage device 101 using a central processing unit 100 (CPU). The display device 103 may be used to display the various images, instructions, and exercises of the literacy system 8. The computer system 105 may include an audio speaker device 104 for delivering audible instructions or feedback to the user. In addition to the computer system 105, a workbook 106 may be used in conjunction with the computer system 105 to provide the student with further instructions and a tangible medium for particular reading and writing exercises.

Returning to FIG. 2, the description of the pre-reading section 80 of the literacy system 8, the physical skill of sequencing may be developed through repetition of carefully constructed exercises. In one embodiment of the literacy system 8, sequencing exercises may be taught by the literacy system in level I 10 of the pre-reading section 80, as shown in FIGS. 1 and 2. While scanning from left to right to read letters may seem automatic to most literate people, the skill of sequencing is not necessarily a natural skill possessed by non-literate students and an imposed, focused skill of this sort is especially problematic for children with ASD. Unlike the sequencing of letters to form words, most other objects that people visually perceive do not require left-to-right sequencing. For example, a car is still a car regardless of whether the student visually perceives it from the left or the right. From the perspective of a child who has spent all the early years of his life learning to overlook the left-to-right sequencing of objects, learning a language in which the sequence of objects forms the basis of understanding may be a daunting task. Even minute changes in the left-to-right sequence of letters may cause critical changes to the meaning of the letter or word. For example, left-to-right sequencing plays an important role in the difference between the letters "b" and "d", the letters "p" and "q", or the words "top" and "pot". Despite the fact that left-to-write sequencing is a critical skill required for reading and writing, the dominant view among literacy systems is that students will "pick it up" and so it receives little or no attention in literacy instruction for normal children and especially children with serious perceptual handicaps such as those with ASD.

In teaching sequencing, the student goes through exercises that mirror certain aspects of reading without requiring actual reading. In place of letters, dimensions familiar to the child such as color or shading are used. The child is shown a sequence and then is given a set of choices from which to select and match the sequence.

A student who cannot read may be familiar with the letters of the alphabet and give the appearance of knowing how to read sequences of letters. Without the physical skill of sequencing, however, actual reading may not be taking place. This is due to the fact that the student may rely on memorizing the letter names rather than on visually retaining the set of symbols during the sequencing exercises. As such, the use of foreign symbols which cannot be named by the child is one component that may be used by the literacy system 8 to teach visual sequencing. Foreign symbols may be any symbols that are not associated with the letters of the written language taught by the literacy system. In one example, a literacy system that teaches the English language may use symbols of the Greek language (a, b, g, and so forth) as foreign symbols in the sequencing exercises. The use of foreign symbols in sequencing exercises mirrors certain aspects of reading without requiring actual reading. Alternatively, and especially appropriate when teaching children with ASD, figures and colors may be used as elements for sequencing. Examples are red square, blue square, yellow square and green square. These examples will be discussed in more detail in connection with the discussion of FIGS. 12-18 hereinafter.

Figure 4:
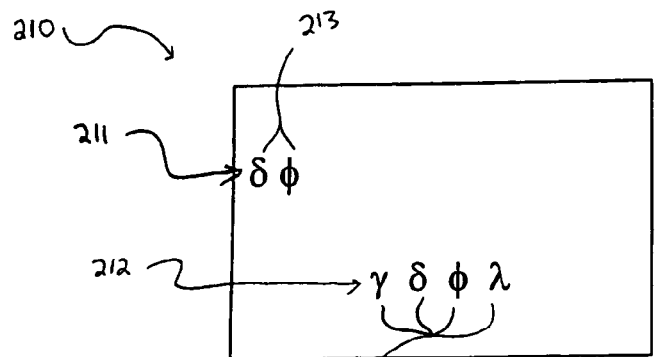
FIG. 4 is an image of a visual sequencing exercise in accordance with one embodiment of the invention.

Visual sequencing may be so novel to a student that even sequences of two elements may be problematic. Therefore, the initial sequencing exercises of the literacy system 8 begin with short patterns of two or three symbols that will be easiest for the student, as shown in FIG. 4. In one embodiment of a sequencing exercise 210, the student is shown two rows 211 and 212 of symbols with the top row 211 presenting a short sequence of two symbols 213 (δφ). The symbols 214 (γδφλ) of the bottom row 212 includes the same two symbols intermingled with additional ones. Thus, the bottom row 212 includes all of the symbols as the top row 211 in left-to-right sequence, but the bottom row 212 includes additional symbols intermingled with those from the top row 211. The student is instructed, via an instructor, a workbook, a computer system, or other instructional means, to view the symbols on the top row 211. Then the student is instructed to identify the symbols in the bottom row 212 that are the same as the symbols in the top row 211. To successfully complete the individual exercise 210, the student must identify, in the correct left to right order, to the same two symbols 213 in the bottom row 212 that appear in the top row 212. This type of sequencing exercise 210 is repeated over several sessions until the student displays a high level of skill. At this point, the student has begun to develop an important intuitive ability possessed by literate people. The student is scanning, in a left-to-right order, short sequences of symbols that are not necessarily easy to label.

Figure 5A:
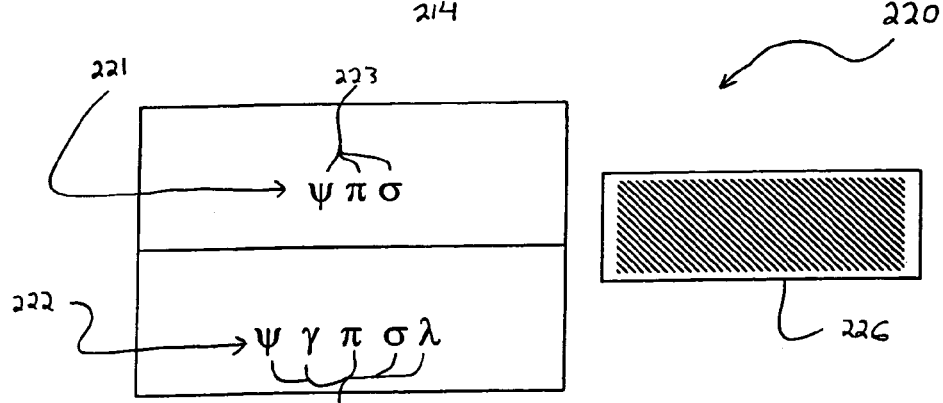
FIGS. 5A-C is a series of images showing another visual sequencing exercise in accordance with one embodiment of the invention.
Figure 5B:
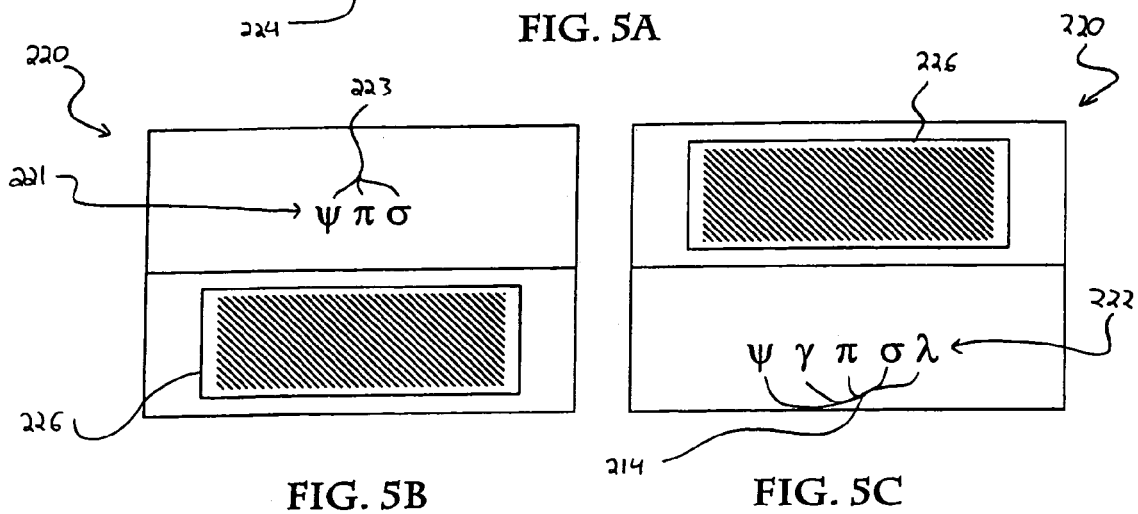
Figure 5C:
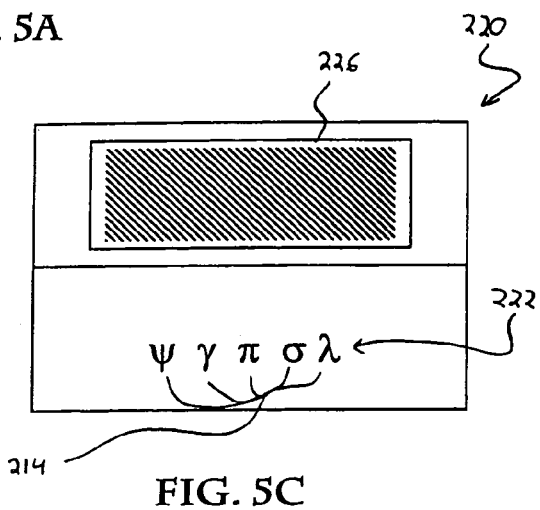

One embodiment of the next type of sequencing exercise 220 is shown in FIGS. 5A-C. This sequencing exercise 220 may be used to develop the skill of retaining in short term memory the sequence of symbols. The exercise 220 includes a top row 221 and a bottom row 222 of symbols 223 and 224. In addition, the exercise 220 may use a covering element 226, which may be used to cover either the top row 221 or the bottom row 222 of symbols. The sequencing-memory exercise 220 may be practiced using a workbook format, a flash card format, a computer system format, or another convention format. Certain formats, such as a computer format, might eliminate the need of the covering element 226.

To successfully complete the exercise 220, the student is instructed to view the symbols 223 in the top row 221 while the symbols 224 of the bottom row 222 are not displayed, as is shown in FIG. 5B. The covering element 226 may be used to cover the bottom row 222. Then, the symbols 223 from the top row 221 are hidden from the student's view, and the symbols 224 in the bottom row 222 are displayed, as shown in FIG. 5C. Without looking back to the symbols 223 in the top row 221, the student is instructed to select, in left to right order, the same symbols from the top row 221 that included in the bottom row 224. At this point, the student is working from memory. Without being able to see the top row 221, the student is forced to make the correct selection is by retaining an image of the original pattern, which develops a hidden intuitive ability possessed by literate people to memorize sequences of symbols.

After the student has become accustomed to retaining sequences of two and three symbols, the patterns increase to four symbols. While four symbols are merely one more than three, it may represent a significant leap in difficulty for the student. When the longer patterns are introduced, the literacy system 8 may revert back to sequencing exercises of direct matching with no memory demands, similar to that of FIG. 4. This is an example of a teaching principal that uses review of prior material with steady additions of new material. In such a case, the literacy system 8 begins to incorporate new, slightly more complex content after the student has shown a mastery of less complex content. However, the literacy system 8 continues to systematically use the less complex skills attained by the student when exposing the student to slightly more complex content.

Figure 6:
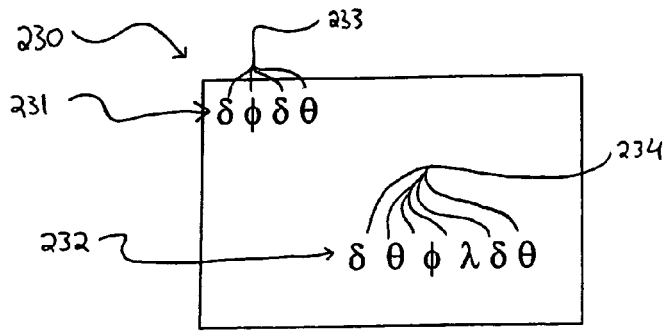
FIG. 6 is an image of a visual sequencing exercise in accordance with one embodiment of the invention.

As shown in FIG. 6, one embodiment of such a sequencing exercise 230 includes two rows 231 and 232 of symbols with the top row 231 presenting a sequence of four symbols 233. Similar to the embodiment shown in FIG. 4, the bottom row 232 includes all of the symbols as the top row 231 in left-to-right sequence, but the bottom row 232 includes additional symbols intermingled with those from the top row 231. The student is instructed to identify the symbols in the bottom row 232 that are the same as the symbols in the top row 231. To successfully complete the individual exercise 230, the student must identify, in the correct left to right order, the same two symbols 233 in the bottom row 232 that appear in the top row 232.

Figure 7A:
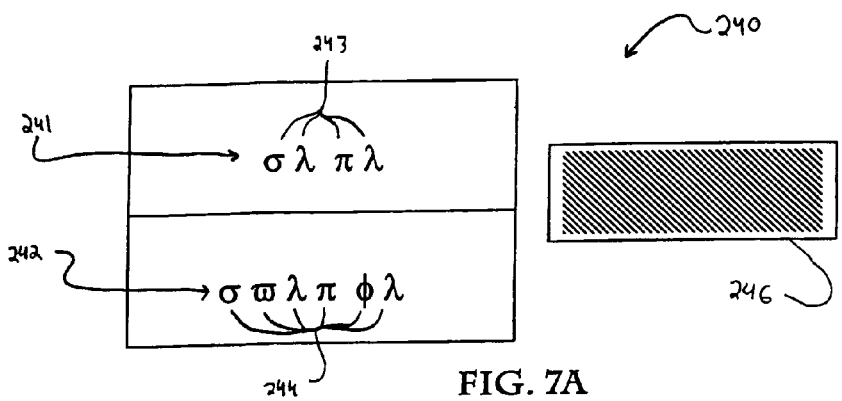
FIG. 7A-C is a series of images of a visual sequencing exercise in accordance with one embodiment of the invention.
Figure 7B:
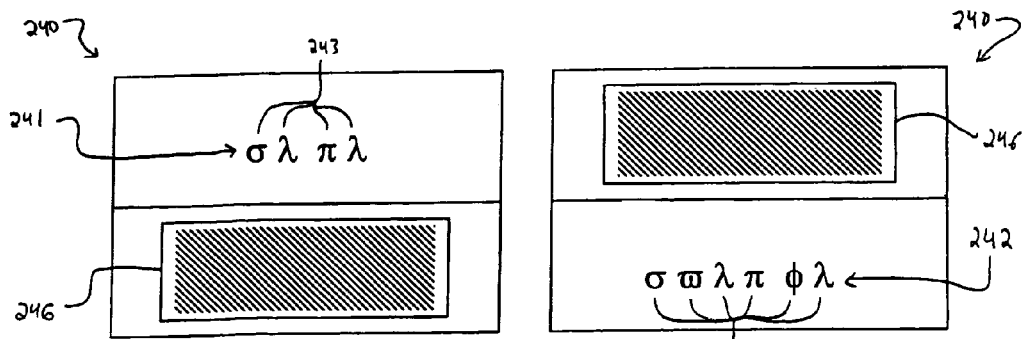
Figure 7C:
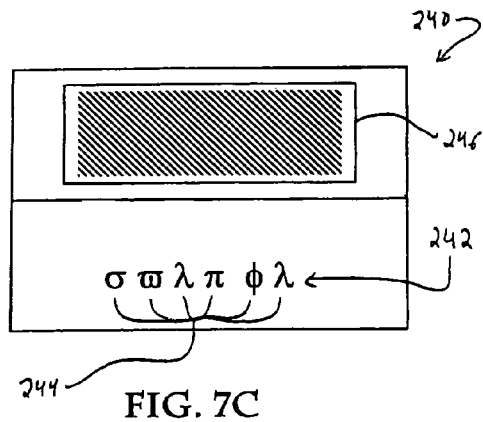

FIGS. 7A-C show another embodiment of a sequencing exercise 240 using a sequence of four symbols. In this exercise 240 the student progresses to memorization of sequences having four symbols. The exercise 240 includes a top row 241 and a bottom row 242 of symbols 243 and 244. Similar to the exercise 220 shown in FIGS. 5A-C, the student is instructed to view the symbols 243 in the top row 241 while the symbols 244 of the bottom row 242 are not displayed, as is shown in FIG. 7B. The covering element 246 may be used to cover the bottom row 242. Then, the symbols 243 from the top row 241 are hidden from the student's view, and the symbols 244 in the bottom row 242 are displayed, as shown in FIG. 7C. Without looking back to the symbols 243 in the top row 241, the student is instructed to select, in left to right order, the same symbols from the top row 241 that included in the bottom row 244.

Figure 8:
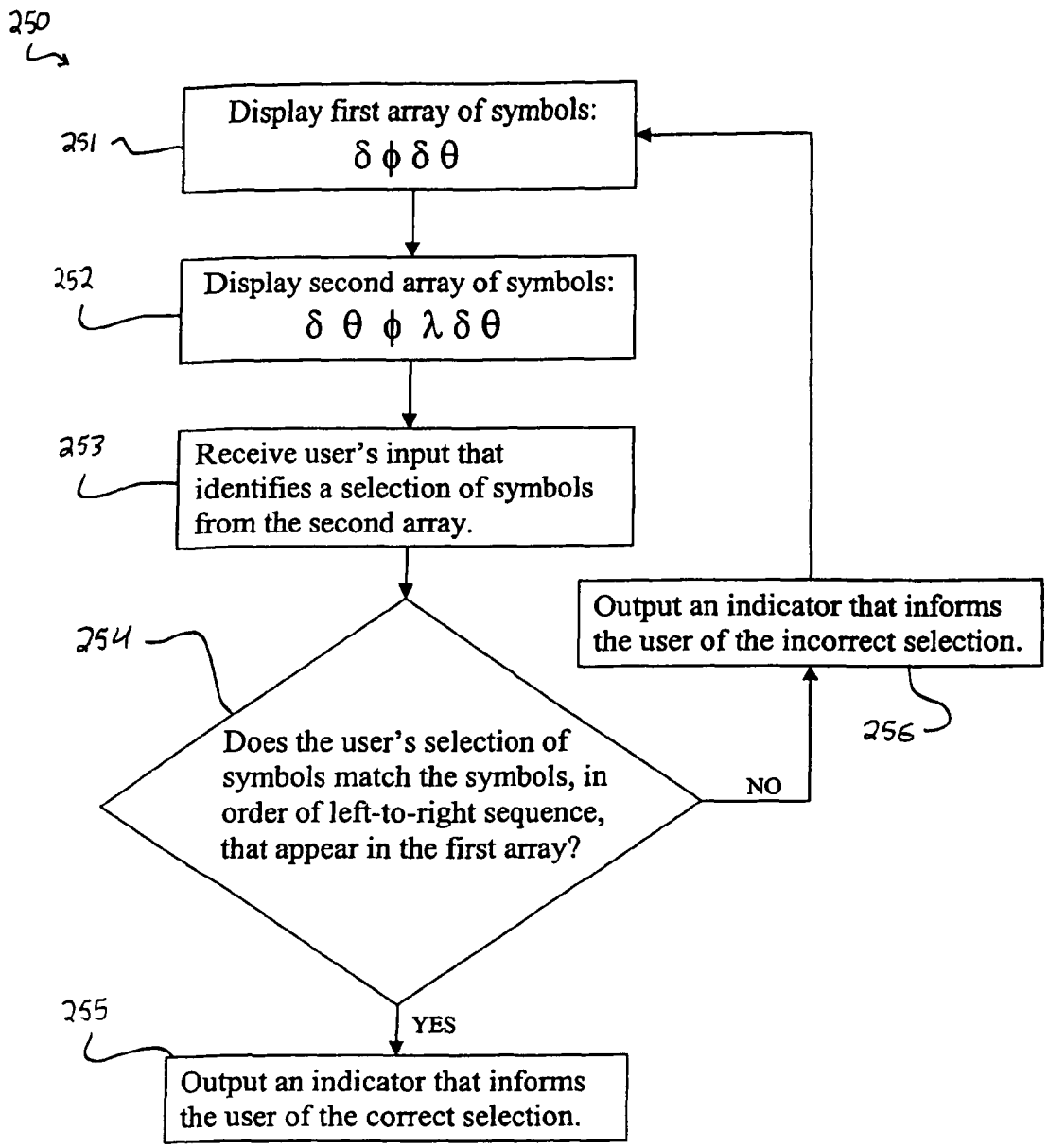
FIG. 8 is a flow chart of instructions for a visual sequencing exercise in accordance with one embodiment of the invention.

In accordance with one embodiment of the literacy system 8, the visual sequencing exercises may be implemented using a computer system. As shown in FIG. 8, a series of functions 250 may be performed by the computer system so as to enable the student to practice the sequencing exercises. The computer system may display a first array of symbols, as shown in step 251. In this example, the symbols are the same foreign symbols shown in FIG. 6. The next step 252 displays a second array of symbols. Depending on the type of visual sequencing exercise that is used, the first array may be displayed while the second array is also displayed such that the student performs direct matching exercises. Otherwise, the first array of symbols may be removed from display while the second array is displayed such that the student performs the sequencing exercise using memorization of the symbols. The student is instructed to identify, in left-to-right order, the symbols in the second array that match those of the first array. In step 253, the computer system receives the student's selection of symbols. The student may input the selection using a user interface device, as previously described. In step 254, the computer system determines whether the student's selection of symbols from the second array correctly matches, in left-to-right order, the symbols from the first array. As shown in step 255, if the student's selection was correct, then the computer system outputs an indicator informing the student of the correct selection, such as a visual indicator on a computer screen or an audible indicator from a speaker. If the student's selection was incorrect, then the computer system outputs an indicator informing the student of the incorrect selection, as shown in step 256. In such a case, the computer system may repeat the steps 251, 252, 253, and 254 so that the student may retry the identical sequencing exercise.

Other physical skills that may be taught in the pre-reading section 80 of the literacy system 8 are the motor skills associated with writing. In one embodiment of the literacy system 8, the motor skills exercises may be taught in level II 20 of the pre-reading section 80, as shown in FIGS. 1 and 2. One reason for teaching a student to effectively write letters prior to reading, or at the start thereof, is that the student may then be able to write any word that she reads. Reading and writing may then be practiced in tandem, each promoting the other. Unlike the skills of visual sequencing, the alphabet generally receives significant attention in the area of early literacy instruction. With ASD children, the teaching is confined generally to exposure to the letters and for those who speak, to naming the letters. For a variety of reasons, (the children's difficulties with fine motor skills, their resistance to writing, the lack of emphasis on handwriting), the children are rarely asked to actually produce the letters—a skill which is required for writing. As described below, the literacy system 8 may include certain aspects to develop these intricate motor skills, such as an early emphasis on lower case letters (in contrast to the emphasis on upper case letters in most early instruction) or sequencing handwriting exercises from simple to complex letter shapes (not by letters in alphabetical order).

In accordance with one aspect of the inventive literacy system 8, the student is not necessarily instructed to practice handwriting of letters in alphabetical order. Learning to write letters in alphabetical order (i.e. practicing the letter "a" prior to practicing the letter "b") may seem more instinctual to a literate person who was previously instructed in this manner or to prior art systems, but the letters "a" and "b" are relative complex shapes compared to other letters. Instead, the literacy system 8 may use exercises of handwriting the letters in order of motor skill simplicity. As such, letters with simpler shape, size and placement may be practiced during the initial steps of the motor skills exercises, and after the student has successfully learned to write these letters, the exercises proceed to teaching letters of more complex shape.

In accordance with another aspect of the inventive literacy system 8, the motor skills exercises emphasize the use of lower case letters in writing. In prior art systems, capital letters dominate the early handwriting training, or at least play an overly-prominent role, which cause students to focus on the less commonly used capital letters and to develop poor habits. By some estimates, less than 1% of the letters on pages read by early reading students appear as capital letters, which may lead to conflict between their reading systems and writing systems. The inventive literacy system 8 highlights the similarities between reading and writing, not necessarily the differences.

Figure 9:
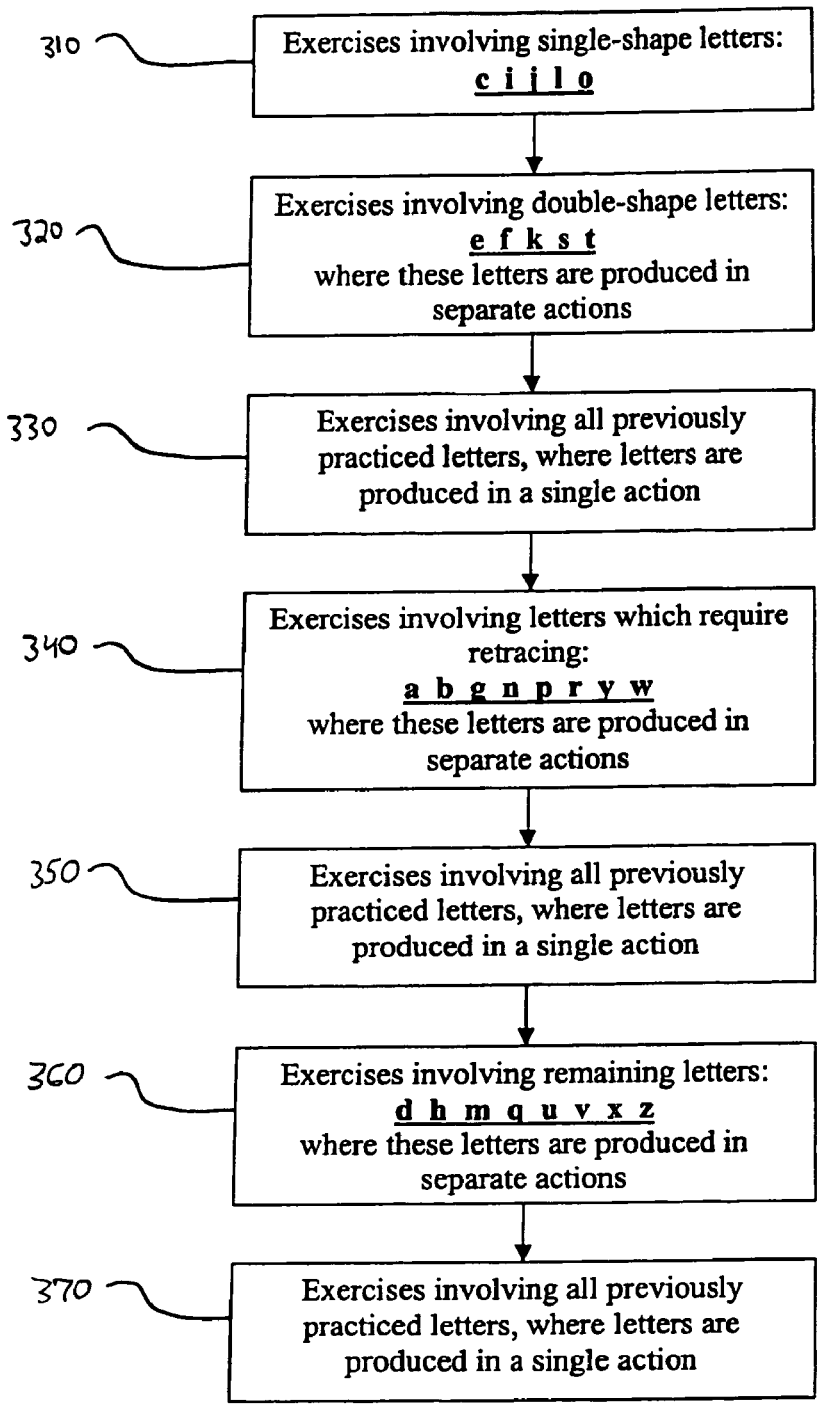
FIG. 9 is a flow diagram of motor skills exercises in accordance with one embodiment of the invention.

One embodiment of motor skills exercises of the literacy system 8 is shown in FIG. 9. The motor skills exercises are divided into seven steps 310, 320, 330, 340, 350, 360, and 370, wherein four steps 310, 320, 340, and 360 introduce new letters of the alphabet to the student. Letters composed of single shapes (c, i, j, l, and o) are introduced to the student in the first step 310. The student may produce each letter by modeling movements of an instructor, such as a human instructor, an image displayed from a computer system, or the like. In the next step 320, the student is introduced to exercises involving double-shape letters (e, f, k, s, and t), but these letters are produced in separate actions. For example, the letter "e" may be constructed with two separate actions: a small horizontal line (-) and a curved shape (C). In such a case, the student would model the horizontal line (-) after the instructor's line, and then the student would model the curved shape (C) after the instructor's action. In keeping with the teaching principle of reviewing prior materials with steady additions of new material, the single-shaped letters that were practiced in the previous step 310 are continued in the handwriting exercises of step 320.

The third step 330 does not introduce new letters, but instead the letters from steps 310 and 320 are produced by the student using a single action. Unlike the previous example of using separate actions to produce the letter "e," this step 330 of the motor skills exercises requires the student to model the letter "e" in a single action after the instructor initially produces the letter in a single action. The next step 340 in the motor skills exercises proceeds to more complex letters that require a retracing action. For example, the letter "n" requires a vertical line (|) in the downward direction with a retracing action over part of the vertical line in the upward direction before completing the letter with a curved shape (ü). The letters requiring a retracing action that are practiced in step 340 include a, b, g, n, p, r, y, and w. Each of these letters is produced by the student using separate actions, such as the downward vertical line (|) for the letter "n" followed by the vertical retracing action in combination with the curved shape (ü). Again, the teaching principle of reviewing prior materials with steady additions of new material is utilized so that the letters from previous step 330 are continued in the handwriting exercises of step 340. Step 350 is similar to the previous step 330, in which all of the letters previously taught are practiced using single actions. However, step 350 includes the letters that were practiced in step 340 (a, b, g, n, p, r, y, and w).

So as not to overload the student, the letters which require retracing are introduced in two different steps 340 and 360. Step 360 introduces the remaining letters of the alphabet that have not yet been introduced (d, h, m, q, u, v, x, and z), including some letters that do not require retracing actions (x and z). Each newly introduced letter is produced by the student using separate actions, as described in previous examples. Also, previously practiced letters are included in the exercises of step 360 so as to review prior material with steady additions of new material. Subsequently, step 370 includes exercises involving all letters, but the student is required to complete each letter using a single action.

Figure 10:
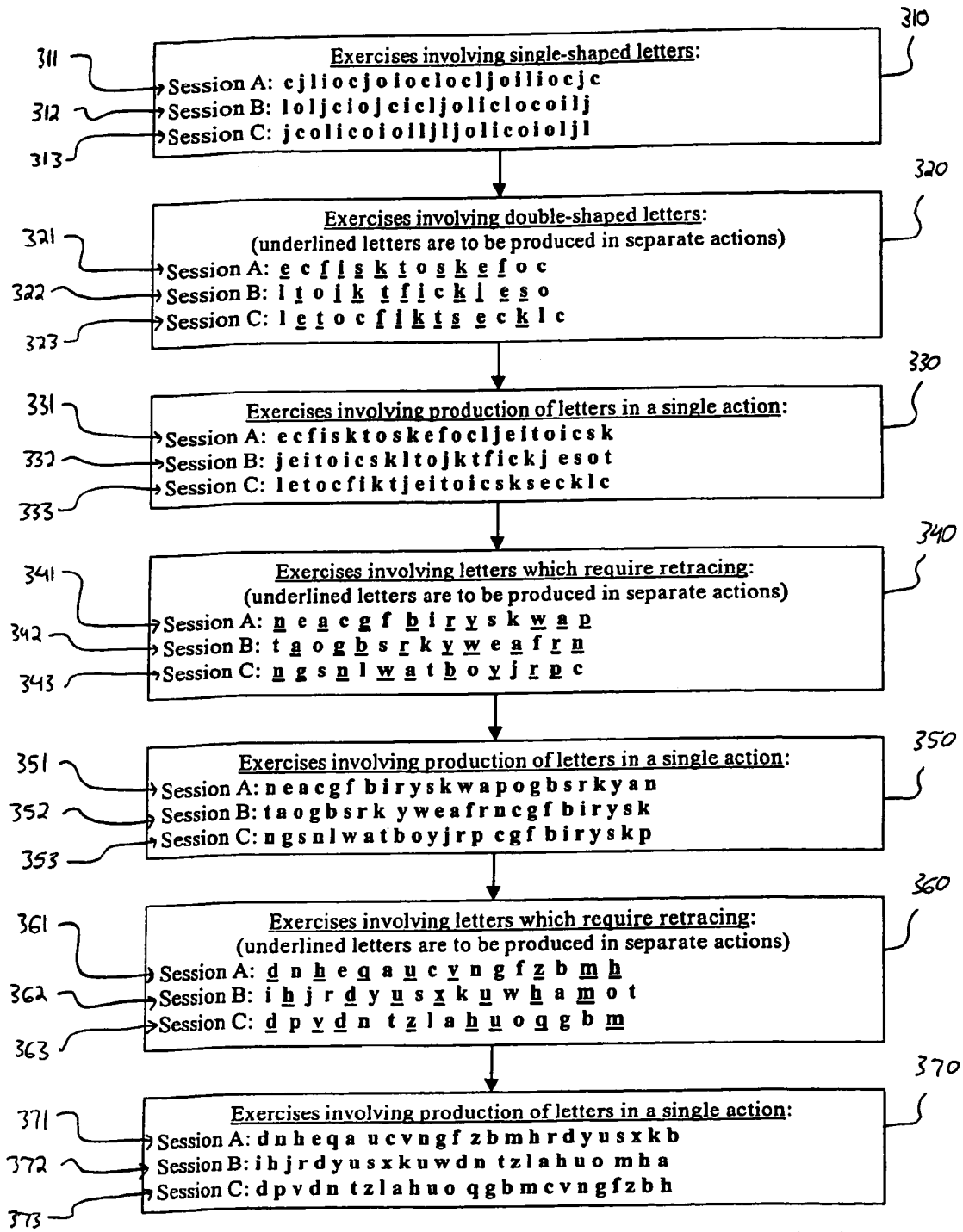
FIG. 10 is a flow diagram of a further embodiment of the motor skills exercises of FIG. 9.

FIG. 10 shows one embodiment of the steps 310, 320, 330, 340, 350, 360, and 370 used in the motor skills exercises of the literacy system 8. Each step includes sessions in which the student produces certain letters in a particular order. For example, step 310 includes three sessions 311, 312, and 313, which provide exercises for writing the single-shaped letters in a certain order. The student is not necessarily required to write the same letter in a repetitive manner, but instead the student shifts from one single-shaped letter to the next so as to resemble actual reading and writing skills. In one embodiment, the student may be required to complete each session 311, 312, and 313 up to six times for a total of eighteen sessions, at which point the student may proceed to the next step 320.

The sessions 321, 322, and 323 of step 320 in FIG. 10 show the intermingling of single-shaped letters (c, i, j, l, and o) with double-shaped letters (e, f, k, s, and t) throughout the exercise. Certain letters in step 320 (i, j, e, f, k, s, and t) may be completed by the student using separate actions. Again, one embodiment of the motor skills exercises may require the student to complete each session 321, 322, and 323 up to six times for a total of eighteen sessions. After the student has completed the required sessions, then the student may proceed to the subsequent step 330. The pattern continues in a similar manner until the student has completed the required sessions through step 370, at which point the student has completed the motor skills exercises of the pre-reading section 85 of the literacy system 8.

Figure 11:
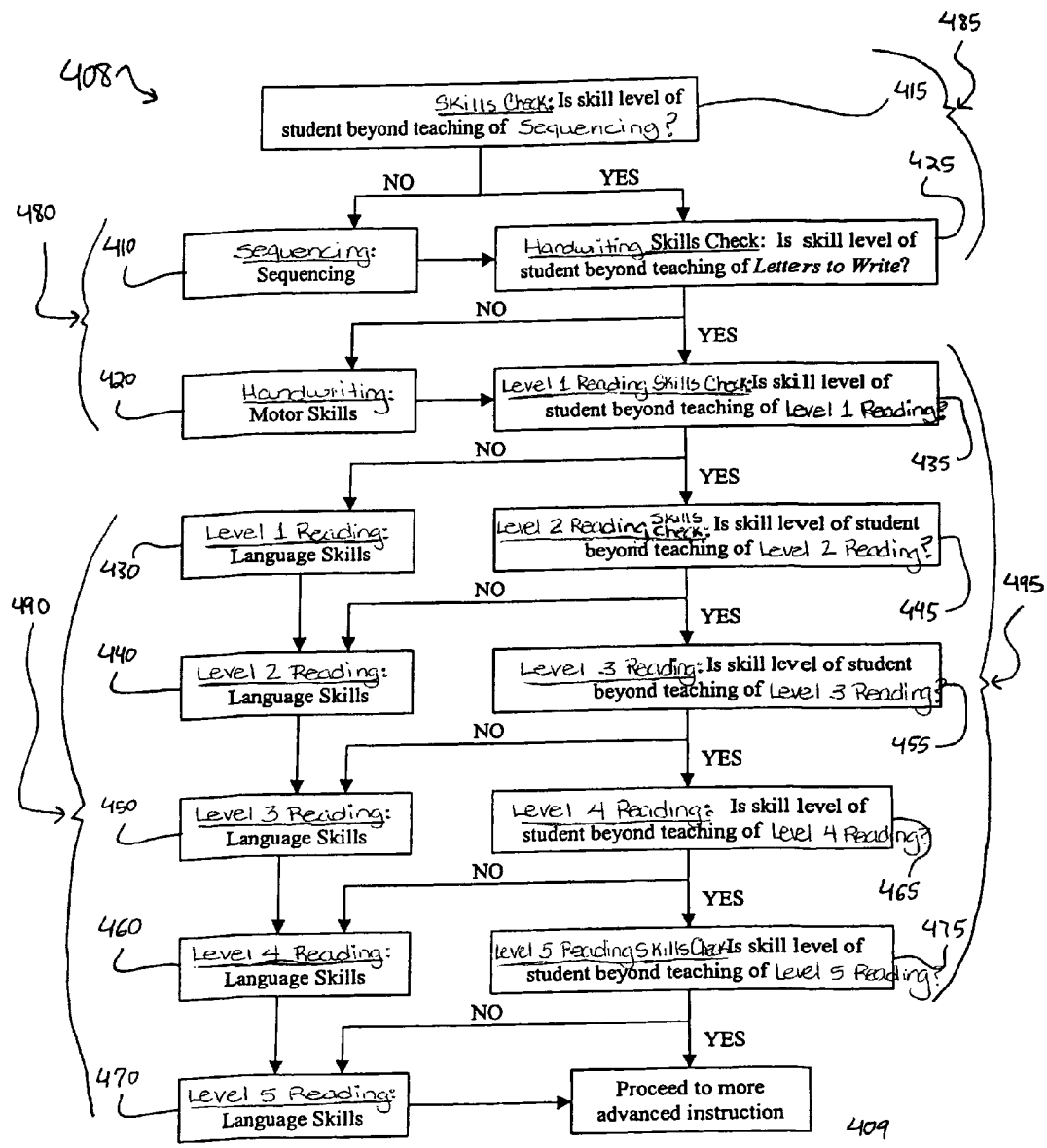
FIG. 11 is a flow diagram of a further embodiment of the literacy system of FIG. 2.

An exemplary embodiment of a literacy system 408 is shown in FIG. 11, which may be implemented using a computer system, a workbook, an instructional video or classroom presentation, or a combination thereof. Similar to the embodiment shown in FIG. 2, the literacy system 408 teaches the skills of visual sequencing, motor skills, the language activities using the skills of phonology, semantics, syntax, and text via multiple levels of instruction. The first section 480 teaches visual sequencing and motor skills of alphabet writing through two preparation levels: 410 and 420. While both levels 410 and 420 are building blocks for the subsequent levels, they may be independent from each other such that one does not build upon the other. For example, a student may already have the satisfactory motor skills in handwriting, but may not have satisfactory sequencing skills. In such a case, the Skills Check 415 and the Skills Check 425 would show that the student should complete 410 while bypassing 420.

It will be understood that many children with ASD do not have developed skill sets or do not retain skill sets that have been previously taught to them. Therefore, it is common to repeat a skill set even if a skills check indicates the student has been exposed to the skill previously. In teaching methods used with ASD children, "skills checks" may also be referred to as "progress checks." The subsequent unit levels 430, 440, 450, 460, and 470 teach the language activities using the skills of phonology, semantics, syntax, and text while building upon the visual sequencing and motor skills covered in unit 480. The level progression includes following written and spoken commands, reproducing declarative sentences, answering simple questions, answering more complex questions, and reproduction of simple stories. The exercises increase in difficulty with each subsequent level. These levels may not isolate each of the language skills in different exercises, but instead the language skills section 490 combines the four language skills (phonology, semantics, syntax, and text) in exercises of advancing linguistic complexity and length using content words, non-content words, and books. The content steadily increases in complexity so that with each succeeding unit level, the words become more intricate, the concepts more abstract, the sentences longer, and the texts richer.

A set of skill checks (progress checks) 415, 425, 435, 445, 455, 465, and 475 assess the student's ability to proceed to higher levels of instruction. The literacy system 408 may be implemented such that the student progresses through the subsequent levels without returning to the skill checks. Alternatively, the literacy system 408 may be implemented such that the student returns to the skill checks on a regular basis to determine if any subsequent levels may be bypassed.

For the large group of autistic children who have little or no expressive language skills, learning to read and write is generally more difficult. The literacy system may include modifications so that these children have a greater likelihood of success when learning reading and writing. For example, autistic children frequently become nervous when they are forced to expose what they know or do not know. The autistic child will shut down. So bypassing of already mastered skills may not be carried out. Instead, by allowing the autistic child to go through sections they know, the emotional situation is eased for them and progress may be smoother.

Referring back to FIG. 1, the literacy system 8 includes a pre-reading section 80 and a language skills section 90, which focus, respectively, on teaching physical skills and early reading/writing skills. When the literacy system 8 is used to teach reading and writing skills to children having certain conditions, developmental disorders, and/or expressive language problems, one or both sections 80 and 90 may be modified to accommodate the particular needs of these children. For example, the sequencing skills exercises taught in level I 10 may be modified to eliminate symbols that are unnecessarily complex to children with autism (described in more detail below). In another example, the phonology skills taught in level III 30 may be adjusted to eliminate or reduce the forced verbal exercises (i.e. instructing the child to say the sound "mmm" when seeing the letter "m") that cause problems for children suffering from a severe expressive language problem.

Figure 12A:
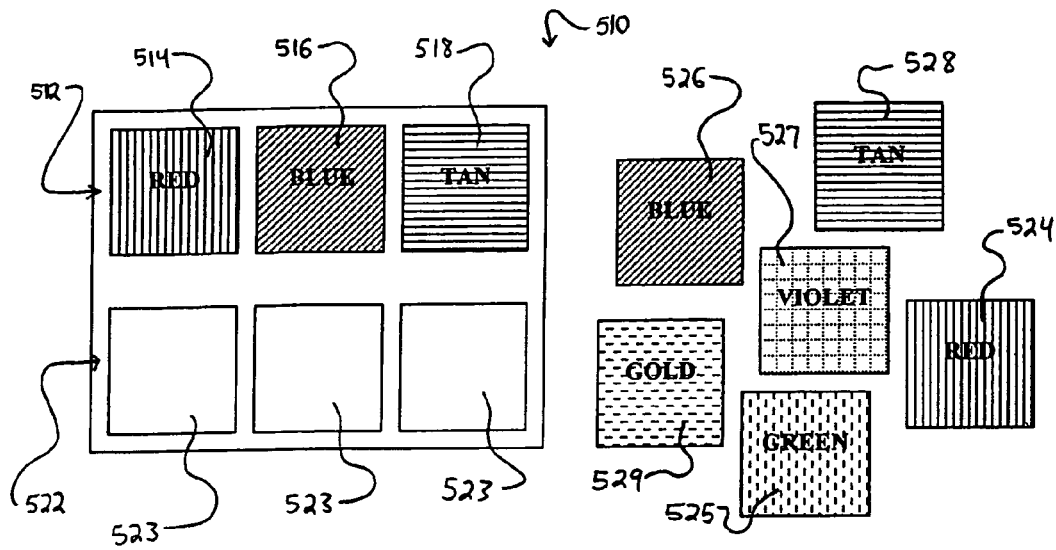
FIGS. 12A-B is a series of images showing a visual sequencing exercise in accordance with another embodiment of the invention.
Figure 12B:
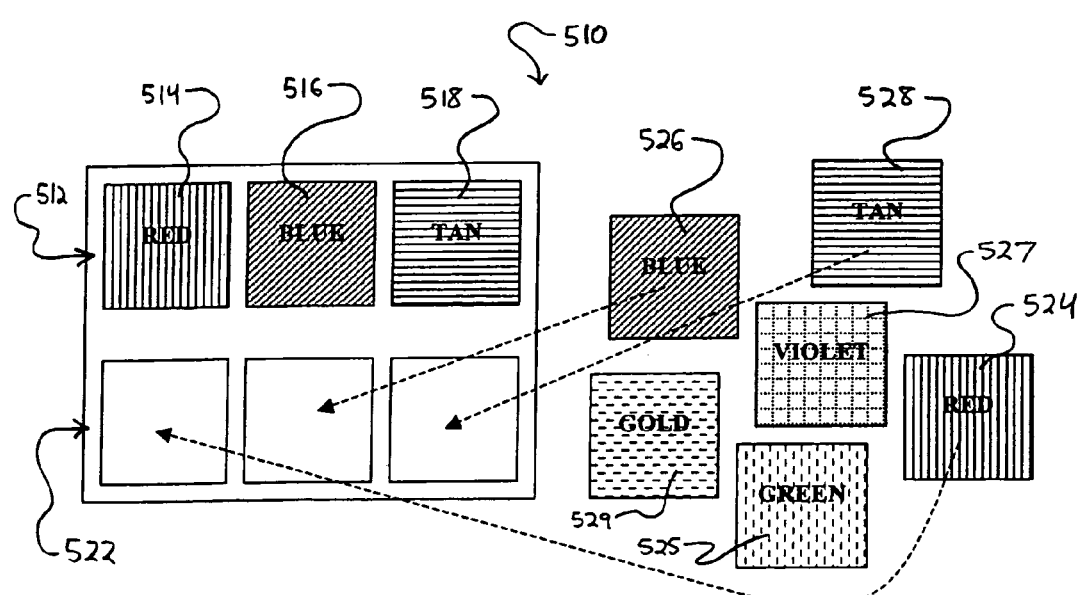

Referring now to FIGS. 12A-B, the sequencing exercises taught by the literacy system 8 in the pre-reading section 80 may be modified to eliminate visualization and memorization of complex symbols. Scanning from left to right in order to read letters may seem automatic to most literate people, but the skill of sequencing is not necessarily a natural skill possessed by non-literate people. Rather, the physical skill of sequencing may be developed through repetition of carefully constructed exercises. These sequencing exercises can use foreign symbols to prevent the student from relying on memorized letter names rather than on visually retaining the set of symbols during the exercises. As previously explained, these foreign symbols may be any symbols that are not associated with the letters of the written language taught by the literacy system. When students having certain conditions or disorders, such as autism, perform the sequencing exercises, complex symbols may unnecessarily detract from the ultimate task at hand—teaching the physical skill of sequencing. Requiring an autistic child to adapt to relatively complex symbols, such as Greek letters, is not productive, especially when the child will likely never use those complex symbols in the future. In such circumstances, the sequencing exercises may include more basic symbols, such as colors, simple shapes, or the like, which accomplish the task of teaching the physical skill of sequencing. As shown in FIG. 12A, a sequencing exercise 510 includes two rows 512 and 522 that are shown to the student. The first row 512 includes an arrangement of three colored chips 514, 516, and 518. In this example, the colored chips are randomly arranged in the order of red chip 514, blue chip 516, and tan chip 518 and may have substantially similar shapes. The student is provided with a supply of colored chips 524, 525, 526, 527, 528, and 529, some of which are colored to match the chips arranged in the first row 512.

As shown in FIG. 12B, the second row 522 includes blank spaces 523 that are adapted to receive one of the colored chips from the student. The student is instructed, via an instructor, a workbook, a computer system, or other instructional means, to view the symbols in the first row 512 (i.e. the red chip 514, blue chip 516, and tan chip 518). Then the student is instructed to place chips from the student's supply into the second row 522 in a matching left-to-right sequence (i.e. the red chip 524, blue chip 526, and tan chip 528). To successfully complete the individual exercise 510, the student must identify, in the correct left-to-right order, the three symbols that appear in the first row 512 (i.e. the red chip 514, blue chip 516, and tan chip 518) and place the same three symbols (i.e. the red chip 524, blue chip 526, and tan chip 528) in the second row 522. This type of sequencing exercise 510 may be repeated over several sessions until the student displays a relatively high level of sequencing skills. At this point, the student is scanning, in a left-to-right order, short sequences of symbols that are not necessarily easy for the student to label.

Figure 13A:
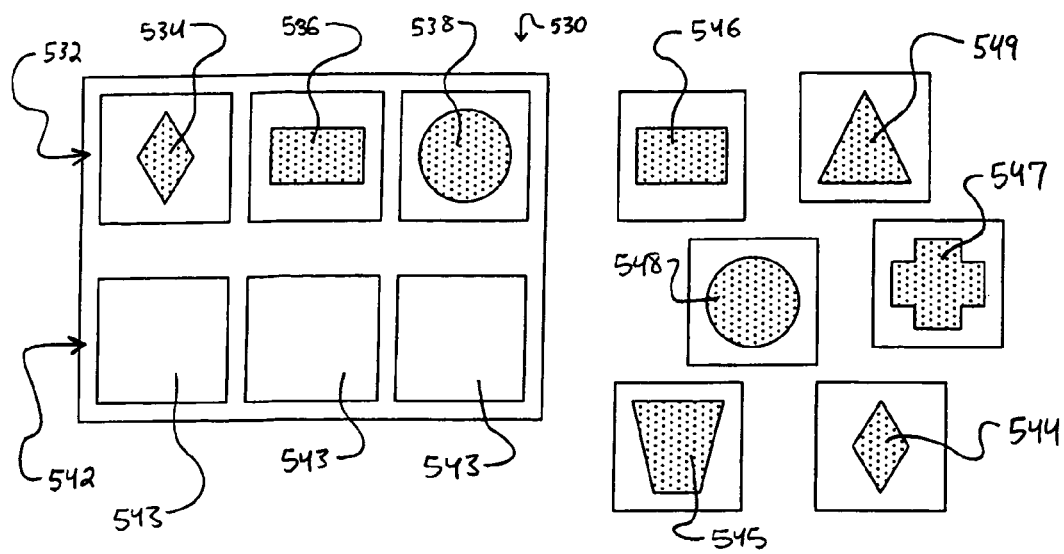
FIGS. 13A-B is a series of images showing a visual sequencing exercise in accordance with one embodiment of the invention.
Figure 13B:
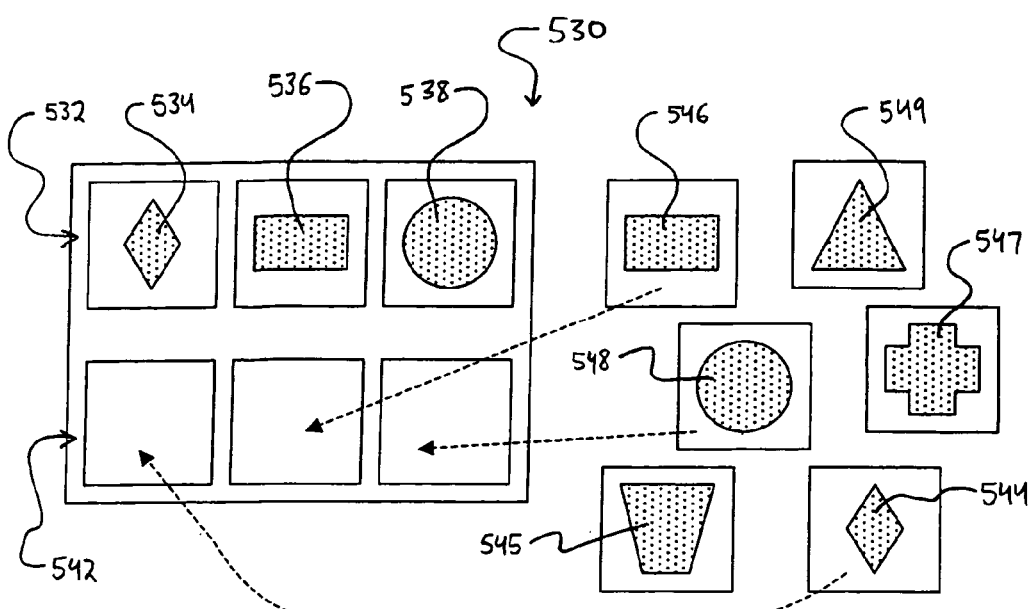

Referring to FIGS. 13A-B, a sequencing exercise 530 may use shapes, such as circles, ovals, and polygons, as foreign symbols that are not associated with letters of the written alphabet. As such, the shapes are used in place of the previously described foreign language letters, which are generally more complex symbols. The exercise 530 includes two rows 532 and 542 that are shown to the student. The first row 532 includes an arrangement of three shapes 534, 536, and 538. In this example, the shapes are randomly arranged in the order of diamond 534, rectangle 536, and circle 538. The student is provided with a supply of chips 544, 545, 546, 547, 548, and 549, some of which include shapes that match the shapes arranged in the first row 532. The second row 542 includes blank spaces 543 that are adapted to receive one of the chips from the student. The student is instructed to view the symbols in the first row 532 (i.e. the diamond 534, rectangle 536, and circle 538). As shown in FIG. 13B, the student is then instructed to place chips from the student's supply into the second row 542 in a matching left-to-right sequence (i.e. the diamond 544, rectangle 546, and circle 548). This type of sequencing exercise 530 may be repeated over several sessions until the student displays a satisfactory level of sequencing skills.

Figure 14A:
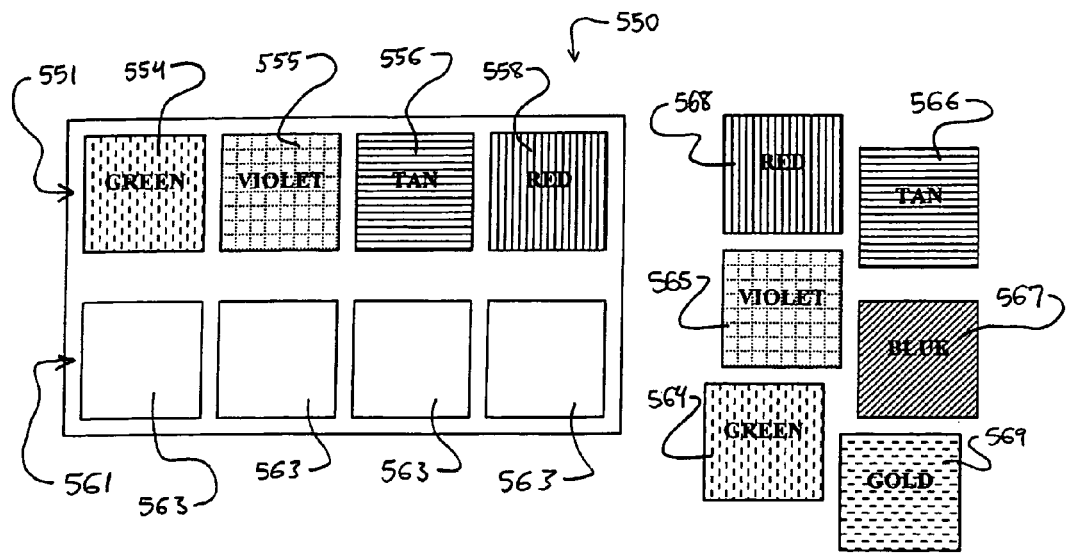
FIGS. 14A-B is a series of images showing a visual sequencing exercise in accordance with a yet another embodiment of the invention.
Figure 14B:
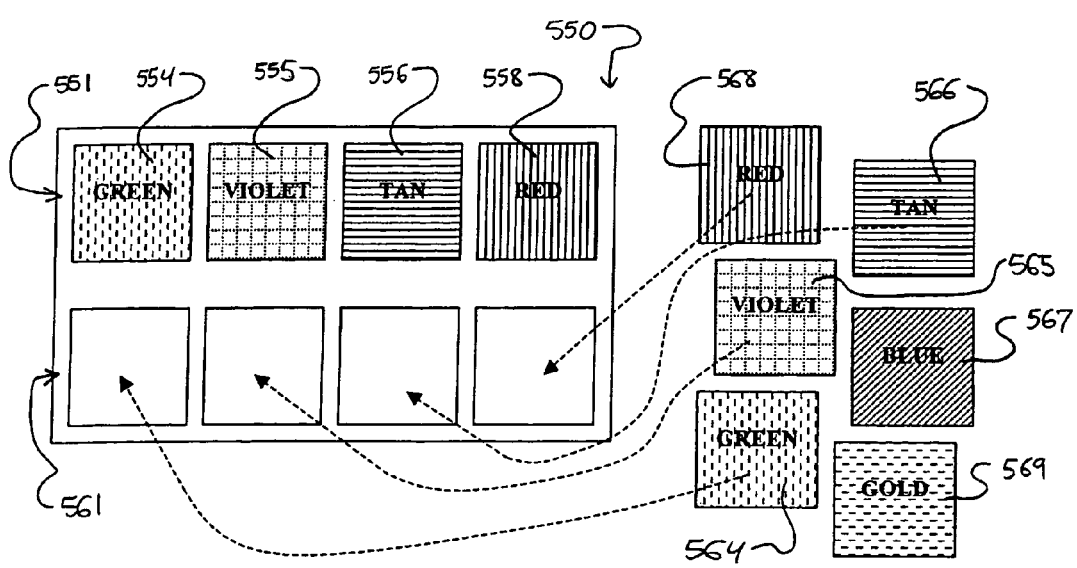

After the student has attained proficiency in retaining sequences of two and three symbols, such as shapes or colored chips, the sequencing exercises may include patterns of four symbols to increase the level of difficulty. Referring to FIGS. 14A-B, a sequencing exercise 550 includes two rows 551 and 561 that are shown to the student. The first row 551 includes an arrangement of four colored chips 554, 555, 556, and 558. In this example, the shapes are randomly arranged in the order of a green chip 554, violet chip 555, tan chip 556, and red chip 558. The student is provided with a supply of chips 564, 565, 566, 567, 568, and 569, some of which include colors that match the chips arranged in the first row 551. The second row 561 includes blank spaces 563 that are adapted to receive one of the chips from the student's supply. The student is instructed to view the symbols in the first row 551 (i.e. the green chip 554, violet chip 555, tan chip 556, and red chip 558). As shown in FIG. 14B, the student is then instructed to place chips from the student's supply into the second row 561 in a matching left-to-right sequence (i.e.

green chip 564, violet chip 565, tan chip 566, and red chip 568). This type of sequencing exercise 550 may be repeated over several sessions until the student displays a satisfactory level of skill at sequencing patterns of four symbols.

Figure 15A:
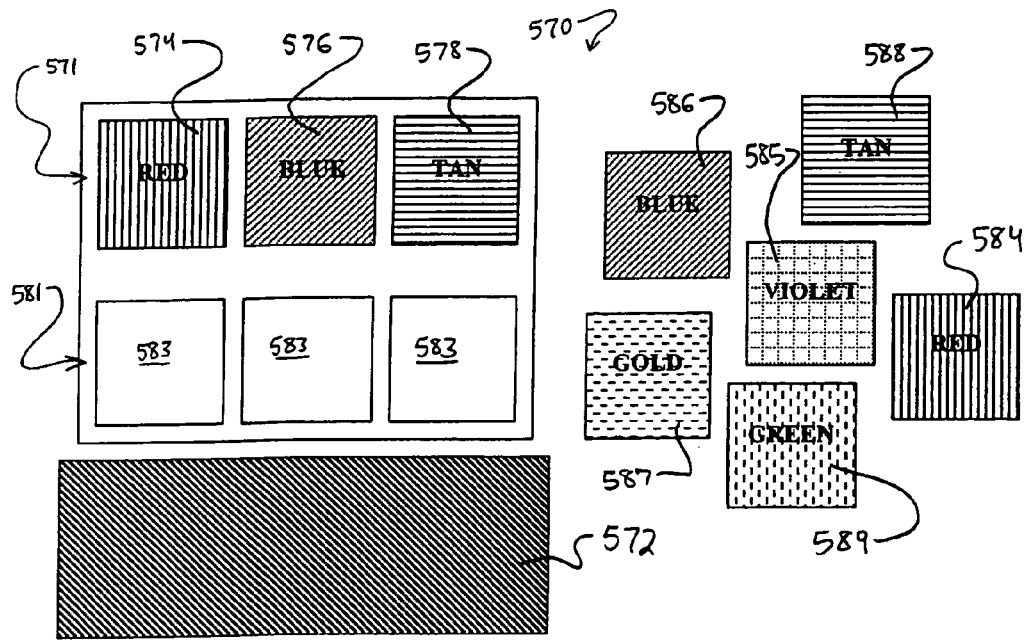
FIGS. 15A-B is a series of images showing a visual sequencing exercise in accordance with a further embodiment of the invention.
Figure 15B:
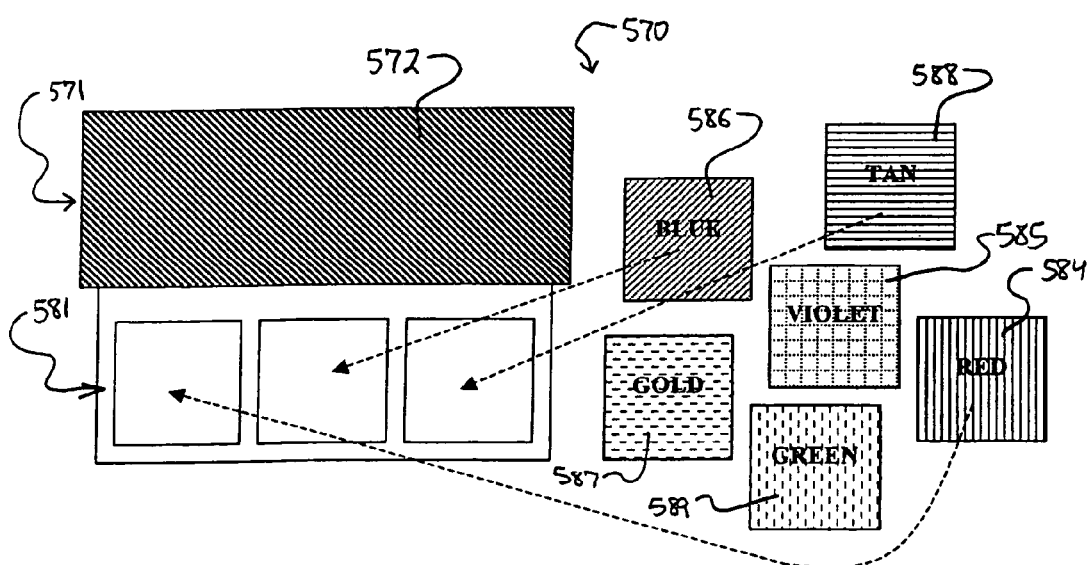

Referring to FIGS. 15A-B, another embodiment of a sequencing exercise 570 may be used to develop the skill of retaining a sequence of symbols in short term memory. The exercise 570 includes a first row 571 and a second row 581, the first row having an arrangement of symbols, such as shapes or colored chips. In this example, the first row 571 includes an arrangement of three colored chips: a red chip 574, a blue chip 576, and a tan chip 578. The student is provided with a supply of chips 584, 585, 586, 587, 588, and 589, some of which include colors that match the chips arranged in the first row 571. In addition, the exercise 570 may use a covering element 572, which may be used to cover either the first row 571 or the second row 581. The sequencing-memory exercise 570 may be practiced using a workbook format, a flash card format, a computer system format, or the like. Certain formats, such as a computer format, might eliminate the need of the covering element 572.

To successfully complete the exercise 570, the student is instructed to view the symbols in the first row 571 (i.e. the red chip 574, blue chip 576, and tan chip 578). If desired, the covering element 572 may be used to cover the second row 581. Then, the symbols 574, 576, and 578 from the first row 571 are hidden from the student's view using the covering element 572, and the blank spaces 583 in the second row 581 are displayed, as shown in FIG. 15B. Without looking back to the symbols in the first row 571, the student is instructed to place, in proper left-to-right order, the same symbols from the student's supply into the blank areas 583. At this point, the student is working from memory. Without being able to view the first row 571, the student is forced to make the correct selections by retaining a mental image of the original pattern, which develops a hidden ability possessed by literate people to memorize sequences of symbols. After the student displays a sufficient skill level with this exercise 570, subsequent exercises may use sequences of four symbols that must be memorized by the student.

As previously described, all of the various sequencing exercises may be implemented using a computer system (refer to FIG. 3 for one example) having a display device to show the various arrangements of symbols. The student may use an interface device (FIG. 3), such as a keyboard, mouse, touchscreen, or the like, to select the proper sequence of symbols in order to successfully accomplish each of the exercises. In addition or in the alternative, the sequencing exercises may be presented to the student in a workbook format or the like. For example, the student may be supplied with a set of colored chips and a workbook, and each page of the workbook may depict an arrangement of colored chips that the student is instructed to replicate.

Some other physical skills that may be taught in the pre-reading section 80 of the literacy system 8 are motor skills associated with writing. One reason for teaching a student to effectively write letters prior to reading, or at the start thereof, is that the student may then be able to write any word that she reads. Reading and writing may then be practiced in tandem, each promoting the other. As previously described, the literacy system 8 may include certain aspects to develop these intricate motor skills, such as an early emphasis on lower case letters (in contrast to the emphasis on upper case letters in most other literacy systems) or ordering handwriting exercises from simple to complex letter shapes (not by practicing to write letters in alphabetical order).

When the literacy system 8 is used to teach motor skills to children having certain conditions or disorders, such as autism, the motor skills exercises may be modified to accommodate their particular needs. For example, some autistic children have particular problems with maintaining both the horizontal and vertical positions of the writing utensil. In such circumstances, early handwriting practice on plain horizontal line may be problematic. In another example, severely autistic children may never attain the skill necessary for steadily controlling the writing utensil to write out sentences or paragraphs. In these cases, the literacy system 8 may be adapted to teach these young children to write by recognizing letters on a conventional computer keyboard.

Referring to FIG. 16, a motor skills exercise 600 may be implemented using a workbook format. A writing page 602 includes a model row 610, an instructor row 620, and a practice row 630. Each of the rows includes at least one constraining area 605, which is defined in this embodiment by a three-sided box having a bottom line 605a and two side lines 605b-c. Each constraining area 605 is configured to have one letter written or printed therein. Rather than using a mere horizontal line to guide the student's writing exercises, the constraining area provides both horizontal and vertical guides for each letter that is practiced by the student in the practice row 630. While using proper horizontal and vertical spacing when writing letters may seem natural to literate people, a non-literate child must actually learn the motor skills associated with maintaining the writing utensil 601 in the proper horizontal and vertical relationship. Such motor skills are especially difficult for children with autism or other like disorders.

To successfully complete the motor skills exercise 600, the student is instructed to view a letter in the model row 610. Then the instructor uses the writing utensil 601 to handwrite the letter in the constraining area 605 of instructor row 620 positioned directly below the letter in the model row 610. Next, the student is instructed to match the instructor's movements and to handwrite the letter in the constraining area of the practice row 630 directly below the letter in the instructor row 620. As previously explained, the practice row is not merely a plain horizontal line. Rather the student practices writing each letter within a constraining area 605 that provides a horizontal and vertical guide for the student. If the student does not write the letter properly or writes outside the constraining area 605, the instructor promptly informs the student of the mistake. Depending on the motor skills and the physical needs of the student, the instructor may support the student's hand as the student is grasping the writing utensil 601.

As previously described, the motor skills exercises introduce letters to be written from simple to complex letter shapes, and does not necessarily introduce letters in alphabetical order. For example, the letters may be introduced to the student for handwriting exercises as described in connection with FIG. 9. Letters composed of single shapes (for example, c, i, j, l, and o) are first introduced to the student. Next, the student is introduced to exercises involving double-shape letters (for example, e, f, k, s, and t). Then the motor skills exercises introduce the student to letters that require retracing (for example, a, b, g, n, p, r, y, and w). Finally, the student is introduced to the remaining letters of the alphabet (for example, d, h, m, q, u, v, x, and z). Accordingly, the literacy system 8 may use exercises of handwriting the letters in order of motor skill simplicity. As such, letters with simpler shape, size and placement may be practiced during the initial steps of the motor skills exercises. Throughout these exercises, the student may practice writing each letter within a constraining area 605 that provides a horizontal and vertical guide. After the student has successfully learned to write these letters, the exercises proceed to teaching letters of more complex shapes.

Referring to FIG. 17, another embodiment of a motor skills exercise 620 may be implemented using a computer system 630. The computer system 630 may include a central processing unit 632 to execute a literacy education software program stored on a memory storage device 634 or on a remote server. The computer system 630 also includes a display device 636 to show certain letters, shapes and messages to the user, and the system 630 includes a touchscreen device 638 that is responsive to contact with a stylus 621. The touchscreen device 638 includes a constraining area 625 disposed on at least a portion of its surface. The constraining area 625 has a similar shape and serves a similar purpose as the one previously described in connection with FIG. 16 (e.g., constraining area 605).

In this embodiment, the display device 636 shows a series of letters, and an identifier box 637 highlights the particular letter that is currently being practiced. Optionally, the display device 636 may show an animated writing utensil that is moved in the proper manner so as to write the particular letter. Next, the student is instructed to write the highlighted letter using the stylus 621 in the constraining area 625 on the surface of the touchscreen device 638. The touchscreen device 638 may include a built-in display device that shows the path of the stylus 621 as it glides across the surface of the touchscreen device 638. Thus, the student is able to see virtual marking that is being made by handwriting exercise. The computer system 630 may be equipped to detect whether the student has written outside the constraining area 625, in which case the student would be instructed to try again. If the student successfully writes the particular letter in the constraining area 625, the computer system 630 may provide visual or audio feedback of the success. Depending on the motor skills and the physical needs of the student, the instructor may support the student's hand as the student is grasping the stylus 621.

Some severely autistic children may never attain the physical skill for steadily controlling the writing utensil to write out complete sentences or paragraphs. These children may also have difficulty with regular verbal communication, leaving them with little or no means to express themselves at an early age. In these cases, the literacy system 8 may be adapted to teach these young children to write by recognizing letters on a conventional computer keyboard. By teaching these children the physical skills necessary to write using a keyboard, they are provided with an opportunity to communicate their sentences in a nonverbal manner.

Figure 18:
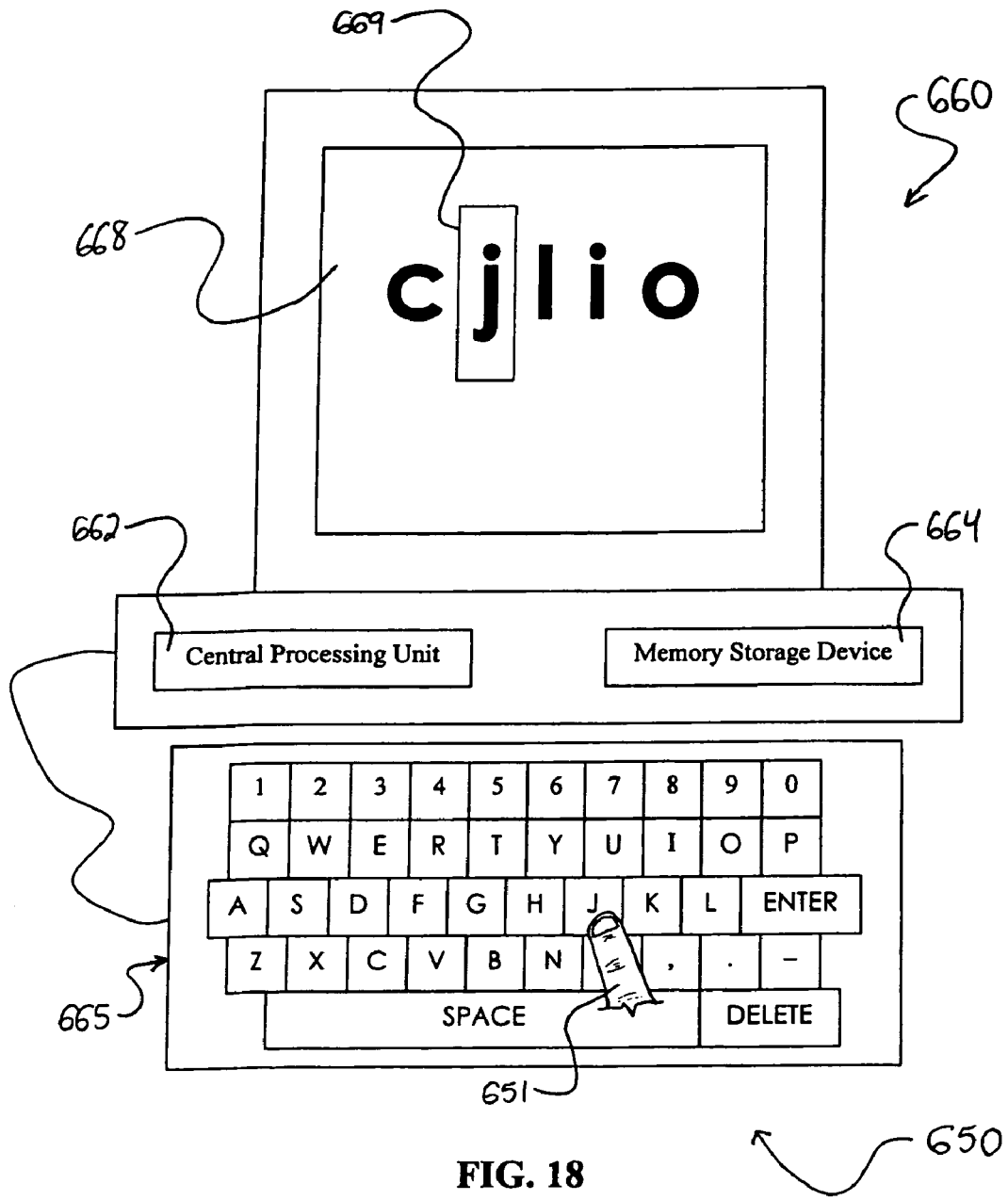
FIG. 18 is a diagram of another motor skills exercise implemented on a computer system in accordance with a further embodiment of the invention.

Referring to FIG. 18, one embodiment of a motor skills exercise 650 may be implemented using a computer system 660 that includes a keyboard 665 and a display device 668. The computer system 660 may also include a central processing unit 662 to execute a literacy education software program stored on a memory storage device 664 or on a remote server. In this embodiment, the display device 668 shows a series of letters, and an identifier box 669 highlights the particular letter that is currently being practiced. Optionally, the display device 668 may show an animated finger that is moved over a particular button on an animated keyboard so as to show the student how to type the particular letter. Next, the student is instructed to move his or her finger 651 over the keyboard 665 and to type the highlighted letter using the keyboard 665. The computer system 660 is equipped to detect whether the student has pressed the incorrect button on the keyboard 665, in which case the student would be instructed to try again. If the student successfully types the particular letter using the keyboard 665, the computer system 660 may provide visual or audio feedback of the success. Depending on the motor skills and the physical needs of the student, the instructor may support the student's hand as the student attempts to press the appropriate button on the keyboard. Such an exercise 650 has a remarkably positive effect on nonverbal autistic children who normally exhibit uncontrolled behavior. After such a child is sat at the computer system 660 to work on the exercise 650, he or she may become surprisingly calm and controlled while working on the various exercises presented on the display device 668.

Figure 19:
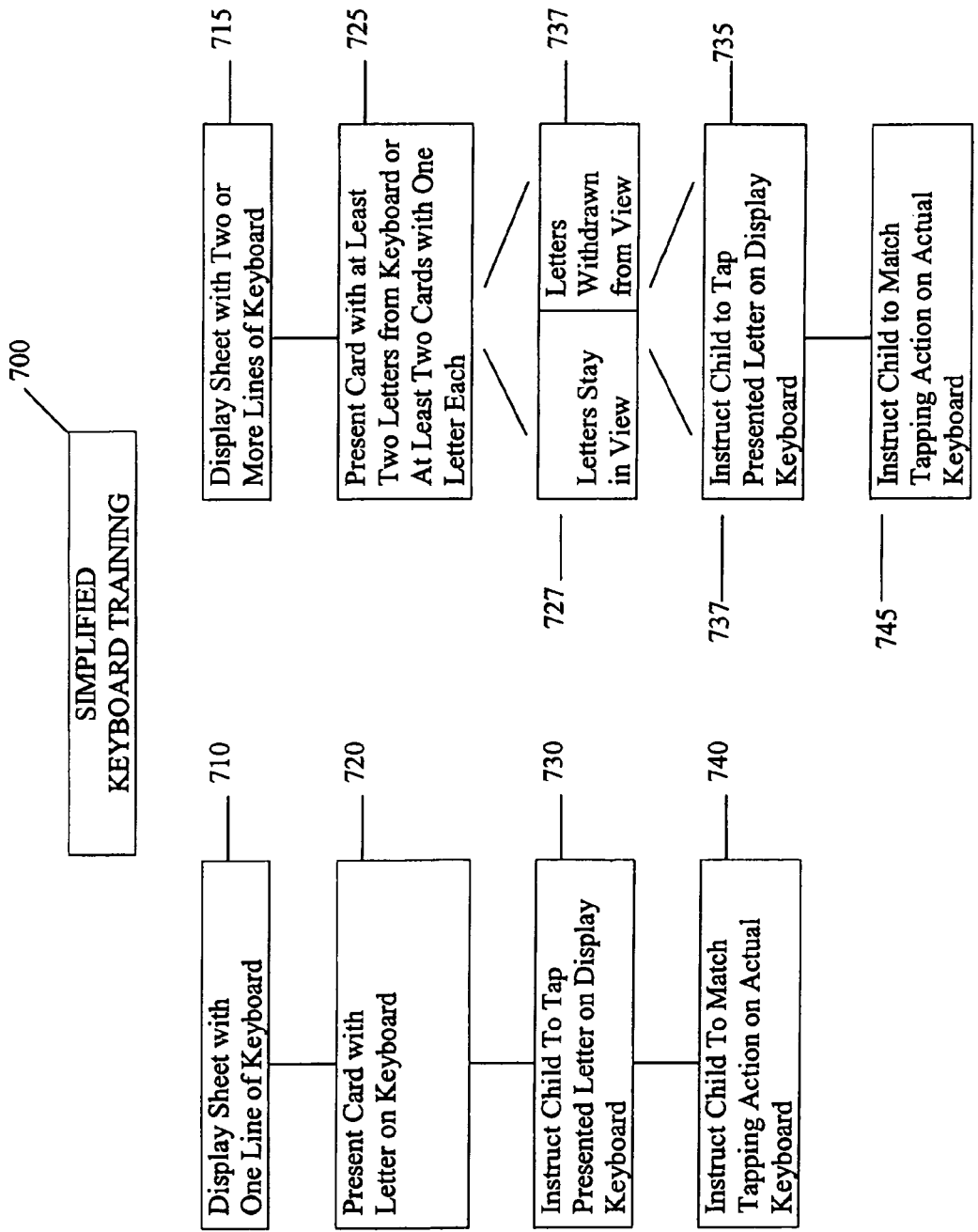
FIG. 19 is a schematic of a flow chart for simplified keyboard training.
Figure 20A:
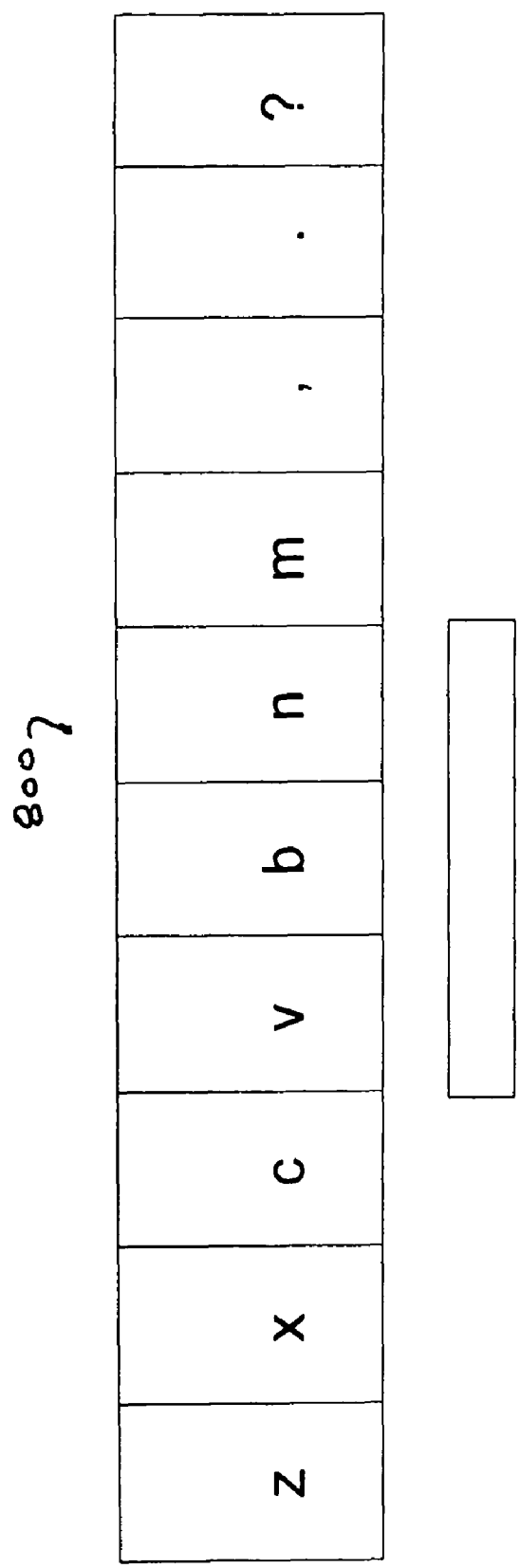
Figure 20C:
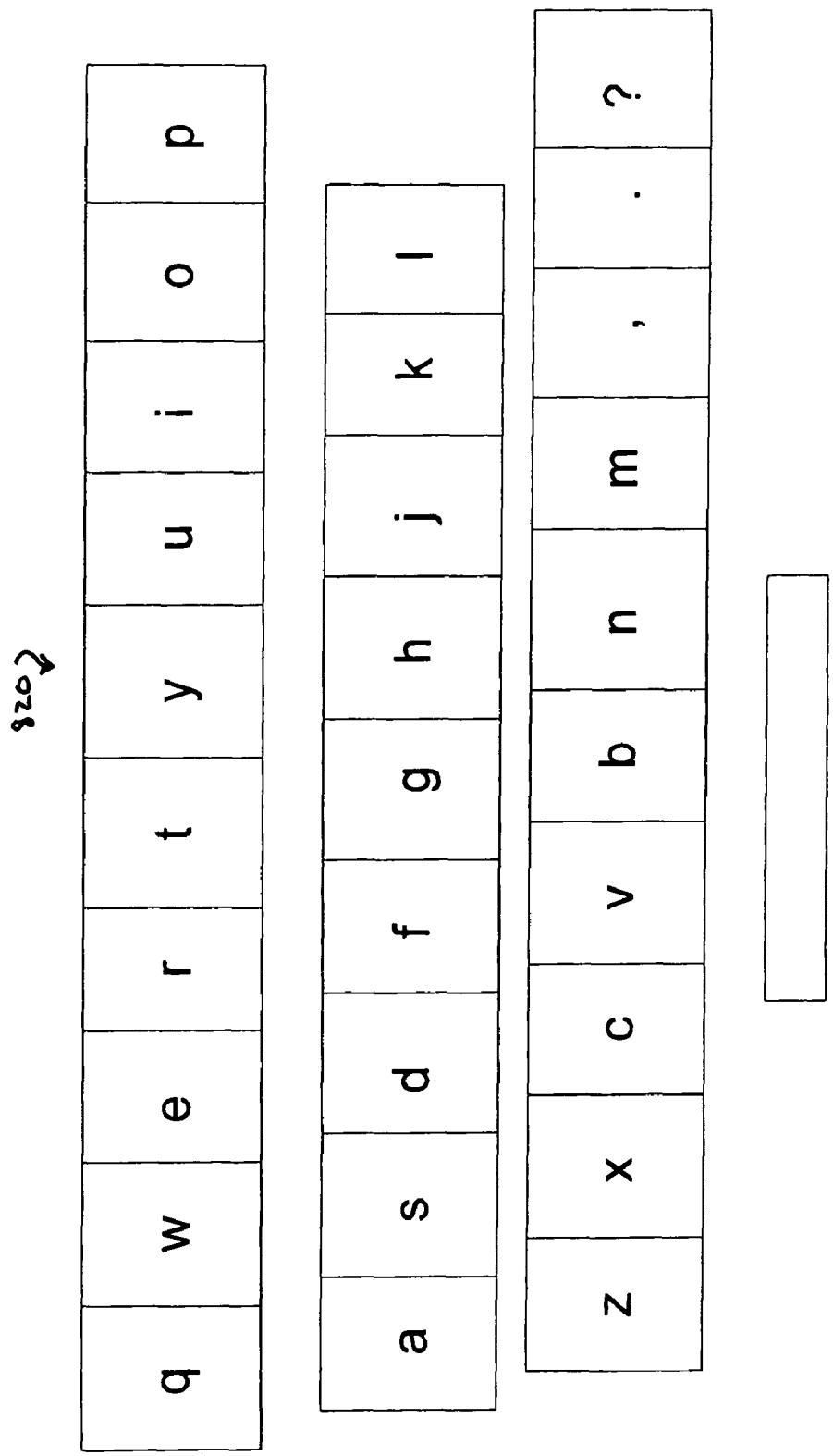

Referring to FIGS. 19 and 20A, 20B and 20C, an even simpler system of simplified keyboard training is available for the ASD children via use of keyboard replicas. FIG. 19 illustrates a flow chart 700 for simplified keyboard training. In this training, students in step 710 or 715 are shown sheets 800, 810 or 820 (see FIGS. 20A, B and C) which represent part or all of the letters of the keyboard (in lower case) and the space bar. In step 720 or 725, the instructor holds up one to four cards (with each card representing a letter, punctuation mark, or space bar from the keyboard). The child is instructed (730 or 735) to tap with a pointer (wooden stick or other device) the presented letter on the display keyboard (800, 810, 825). The child may tap the presented letter(s) on the sheet that matches one or more letters that the instructor is holding (737) or was holding (739) (memory condition). The child can then transfer these skills to the keyboard itself by tapping (740 or 745) the presented letter on the actual keyboard. The student can then independently produce appropriate letters via motor activities that are much simpler than handwriting.

Referring back to FIG. 1, the literacy system 8 may also include a language skills section 90 that teaches various skills in the areas of phonology, semantics, syntax, and text. Just as the pre-reading section 80 might be modified to accommodate the needs of children having certain conditions and disorders, such as autism, the language skills section 90 may also be modified. In one embodiment, language skills exercises that teach phonology skills often instruct the students to verbally express certain sounds (i.e. the child is told to enunciate the sound "mmm" when the letter "m" is displayed). The literacy system 8 may be modified for students with expressive language problems, such as a nonverbal autistic child. In these embodiments, the early levels of the language skills exercises would not include such requests to verbally enunciate sounds.

In another embodiment, the literacy system 8 may be modified for autistic students so that language skills exercises which teach semantic skills have restrictions on the type of content words or vocabulary that may be used. Some content words that would be difficult for autistic children to comprehend are avoided when teaching the various language skills. This restriction applies to nouns, verbs, and adjectives. In one example, a seemingly simple noun such as "king" may not be used because, to understand a word like "king," the student must understand certain role relationships among people. Such a concept is often difficult for autistic children. Similarly, in the domain of verbs, the words must be capable of being demonstrated (by an instructor, via computer graphics on a display device, or the like). For example, a verb such as "sit" is relatively simple to demonstrate, but a verb such as "look" is not. As such, the verb "look" may be restricted from the language skills exercises. In the domain of adjectives, similar constraints may be applied. For example, words referring to moods such as "sad," "mad," and "happy" are often difficult for autistic children to understand, so these adjectives may be restricted from the language skills exercises.

In further embodiment, the literacy system 8 may be modified for autistic students so that language skills exercises which teach syntax and textual skills have supplemental tasks that teach the meanings of the sentences. During the exercises that teach syntax and textual skills, the student is instructed to read and write various sentences. Many autistic children are totally nonverbal and others have limited verbal expression, so their understanding of language is limited. As such, the literacy system 8 may include supplemental tasks that instruct the student to follow commands and answer questions. For example, the student may be instructed to read a command such as "make the girl sit" or "show me the girl who is sitting." Then the student may use a device, such as a computer mouse, to follow such commands. These tasks not only teach the student proper syntax and textual skills, but the child is also educated on the meaning of the sentence. In another example, a question is spoken or displayed to the student, and the student is instructed to answer that question by writing a complete response. The questions should be carefully selected so as to contain key words that can be "carried down" in the answer. For instance, an image of some children eating may be shown to the student, and a question is posed: "What are those boys doing?" The complete response is not: "eating." Rather, the complete response is: "Those boys are eating." (Note that the units "those" "boys" "are" and " . . . ing" are shared in both the question and the answer.) Such exercises require the autistic child to make explicit the implicit "logical" patterns that connect the language of questioner and responder.

As these language skills are mastered, the literacy system 8 provides material to allow the parent to use a small portable computer, such as an ALPHASMART device supplied by AlphaSmart, Inc. of Los Gatos, Calif., to have the nonverbal autistic child use written language throughout the day as a vehicle for communication. This is one way that a nonverbal child can master language skills (via the literacy system) to achieve a reasonable level of verbal communication.

A number of embodiments of the invention have been described. Nevertheless, it will be understood that various modifications may be made without departing from the spirit and scope of the invention. Accordingly, other embodiments are within the scope of the following claims.

What is claimed is:

1. A method for teaching reading skills to a user, the method being implemented on a computer system including a computer-readable storage medium comprising executable instructions stored thereon that, when executed, cause the following operations to be performed:

presenting on a computer display device a first section that includes sequencing exercises for the user of the computer system, the sequencing exercises being used to teach visual sequencing skills, the sequencing exercises including symbols of a first written language that are not associated with letters of a second written language taught in a literacy teaching system, wherein the following operations are performed for the presentation of the sequencing exercises:

displaying on the computer display device a first array of symbols associated with letters of the first written language displaying a second array of symbols, wherein the second array includes:

all of the symbols of the first array in a same order as the first array, and additional symbols intermingled with those from the first array;

prompting the user to identify a selection of symbols from the second array that match the symbols from the first array in order of left-to-right sequence;

receiving the user's input that identifies the selection of the symbols from the second array;

determining if the user's selection of the symbols from the second array matches the symbols that appear in the first array in order of left-to-right sequence; and outputting an indicator to inform the user whether the user's selection of symbols from the second array match the symbols that appear in the first array in order of left-to-right sequence; and upon completion of at least a portion of the sequencing exercises by the user, presenting on the computer display device a second section that includes language exercises for teaching at least one language skill selected from a group consisting of phonology, semantics, syntax, and text.

2. The method of claim 1 wherein the symbols displayed on the computer display device in the first array of symbols include objects having different colors.

3. The method of claim 1 wherein the symbols displayed on the computer display device in the first array of symbols include objects of differing shapes.

4. The method of claim 3 wherein the differing shapes are selected from a group consisting of circles, ovals, and polygons.

5. The method of claim 1 wherein the symbols displayed on the computer display device in the first array of symbols are Greek symbols.

6. The method of claim 1 wherein the user's selection of symbols from the second array requires the physical skill of visually scanning symbols in a left-to-right sequence.

7. The method of claim 1 wherein the first array of symbols is not displayed when displaying the second array of symbols.

8. The method of claim 1 wherein the indicator is output via an audio device of the computer system.

9. The method of claim 1 wherein the indicator is output via the display device of the computer system.

10. The method of claim 1 wherein the user's selection of symbols from the second array requires the physical skill of memorizing sequences of symbols.

11. The method of claim 1 wherein the operation of presenting on the computer display device the first section that includes motor skills exercises for teaching handwriting letters of the English language, the motor skills exercises introducing letters in a non-alphabetic order.

12. The method of claim 11 wherein the motor skills exercises include a constraining area that provides a guide.

13. The method of claim 1 wherein the operation of presenting on the computer display device the first section that includes motor skills exercises for teaching typing of letters of the written language.

14. A literacy system for teaching reading skills to a user, the literacy system being implemented on a computer system including a computer-readable storage medium comprising executable instructions stored thereon that, when executed, cause the following operations to be performed:

presenting on a computer display device a first section that includes sequencing exercises for the user of the computer system, the sequencing exercises being used to teach visual sequencing skills, the sequencing exercises including symbols of a first written language that are not associated with letters of a second written language taught by the literacy system, wherein the following operations are performed for the presentation of the sequencing exercises:

displaying on the computer display device a first array of symbols associated with letters of the first written language;

displaying a second array of symbols, wherein the second array includes:
 all of the symbols of the first array in a same order as the first array, and
 additional symbols intermingled with those from the first array,
 removing the first array of symbols from view on the display device when the second array is displayed on the display device, wherein the second array of symbols is non-viewable on the display device when the first array is displayed on the display device;
 receiving the user's input that identifies a selection of the symbols from the second array;
 determining if the user's selection of the symbols from the second array matches the symbols that appear in the first array in order of left-to-right sequence; and
 outputting an indicator to inform the user whether the user's selection of symbols from the second array match the symbols that appear in the first array in order of left-to-right sequence; and
upon completion of at least a portion of the sequencing exercises by the user, presenting on the computer display device a second section that includes language exercises for teaching at least one language skill selected from a group consisting of phonology, semantics, syntax, and text, wherein the language exercises are selected based on the indicator regarding the sequencing exercises.

15. The literacy system of claim 14 wherein the operation of presenting on the computer display device the first section further comprises prompting the user to identify the selection of symbols from the second array that match the symbols from the first array in order of left-to-right sequence.

16. The literacy system of claim 14 wherein the symbols displayed on the computer display device in the first array of symbols include objects having different colors.

17. The literacy system of claim 14 wherein the symbols displayed on the computer display device in the first array of symbols include objects of differing shapes.

18. The literacy system of claim 17 wherein the differing shapes are selected from a group consisting of circles, ovals, and polygons.

19. The literacy system of claim 14 wherein the symbols displayed on the computer display device in the first array of symbols are Greek symbols.

20. The literacy system of claim 14 wherein the user's selection of symbols from the second array requires the physical skill of visually scanning symbols in a left-to-right sequence.

21. The literacy system of claim 14 wherein the indicator is output via an audio device of the computer system.

22. The literacy system of claim 14 wherein the indicator is output via the display device of the computer system.

23. The literacy system of claim 14 wherein the user's selection of symbols from the second array requires the physical skill of memorizing sequences of symbols.

24. The literacy system of claim 14 wherein the operation of presenting on the computer display device the first section that includes motor skills exercises for teaching handwriting letters of the English language, the motor skills exercises introducing letters in a non-alphabetic order.

25. The literacy system of claim 24 wherein the motor skills exercises include a constraining area that provides a guide.

26. The literacy system of claim 14 wherein the operation of presenting on the computer display device the first section that includes motor skills exercises for teaching typing of letters of the written language.

* * * * *